(12) United States Patent
Carr

(10) Patent No.: US 7,332,529 B2
(45) Date of Patent: Feb. 19, 2008

(54) THERMOREVERSIBLE ORGANOGELATORS, COMPOSITIONS AND METHODS OF MAKING THEREOF

(76) Inventor: Andrew J. Carr, 3209 Redbud Trail, Sherman, TX (US) 75092

( * ) Notice: Subject to any disclaimer, the term of this patent is extended or adjusted under 35 U.S.C. 154(b) by 405 days.

(21) Appl. No.: 10/973,126

(22) Filed: Oct. 26, 2004

(65) Prior Publication Data

US 2006/0089416 A1    Apr. 27, 2006

(51) Int. Cl.
B01J 13/00 (2006.01)
C09K 3/32 (2006.01)
C07C 273/00 (2006.01)
C07C 275/00 (2006.01)
C10L 7/00 (2006.01)

(52) U.S. Cl. .......................... 516/20; 516/102; 564/32; 44/270; 588/252; 588/901

(58) Field of Classification Search ................... 516/20, 516/102; 564/32; 44/270; 588/252, 901
See application file for complete search history.

(56) References Cited

U.S. PATENT DOCUMENTS

| | | | |
|---|---|---|---|
| 5,015,754 A * | 5/1991 | Dix et al. ..................... | 564/32 |
| 5,106,873 A | 4/1992 | O'Brien et al. | |
| 6,552,092 B2 * | 4/2003 | Ebbrecht et al. .............. | 516/31 |
| 6,858,666 B2 | 2/2005 | Hamer et al. | |
| 6,860,928 B2 | 3/2005 | Breton et al. | |
| 6,872,243 B2 | 3/2005 | Breton et al. | |
| 2003/0105185 A1 | 6/2003 | Goodbrand et al. | |
| 2004/0122235 A1 | 6/2004 | Polisetti et al. | |
| 2004/0249210 A1 | 12/2004 | Breton et al. | |
| 2005/0250857 A1 * | 11/2005 | van Bommel et al. ........ | 516/27 |

FOREIGN PATENT DOCUMENTS

WO    WO 00/35998    6/2000

OTHER PUBLICATIONS

Kimberly R. Deaton, Low Molecular Weight Bis-Urea Organogelators, Feb. 21, 2002, pp. 9-16.*
New Functional Materials Based on Self-Assembling Organogels: From Serendipity towards Design, van Esch, H.H.; Feringa, B.L. *Angew, Chem. Int.Ed.* 2000, 39, 2263-2266.
Gels from Small Molecules in Organic Solvents: Structural Features of a Family of Steroid and Anthryl-based Organogelators, Teresch, P.; Furman, I.; Weiss, R.G.; Bouas-Laurant, H.; Desvergne, J.P.; Ramasseul, R., *Faraday Discuss.* 1995, 101, 345-358.
Low Molecular Mass Gelators of Organic Liquids and the Properties of Their Gels, Teresch, P.; Weiss, R.G., *Chem. Rev.*, 1997, 97, 3133-3159.
Low-molecular weight organogelators, Terech, P., *Specialist Surfactanta*; Robb, I.D., Ed.; Chapman Hall: Cambridge, 1997, p. 208-268.

Prominent Gelation and Chiral Aggregation of Alkylamides Derived from trans-1,2-Diaminocyclohexane, Hanabusa, K. Yamada, M.; Kimura, M.; Shirai, H., *Agnew. Chem. Int. Ed. Engl.*, 1996, 35, 1949-1951.
Design and Synthesis of Highly $CO_2$-Soluble Surfactants and Chelating Agents, Hoefling, T.A.; Beitle, R.R.; Enick, R.M.; Beckman, E.J.; *Fluid Phase Equilib.*, 1993, 83, 203-12.
Molecular Design and Characterizations of New Colixarene-base Gelators of Organic Fluids, Aoki, M.; Nakashima, K.; Kawabata, H.; Tsutsui, S.; Shinkkai, S.; *J.Chem. Soc. Perkin Trans.*, 1993, 347-354.
Formation of Organogels by Intermolecular Hydrogen Bonding between Ureylene Segment, Hanabusa, K.; Shimura, K.; Hirose, K.; Kimura, M.; Shirai, H., *Chem. Lett.*, 1996, 885-886.
Cyclo(dipeptide)s as Low-molecular-mass Gelling Agents to Harden Organic Fluids, Hanabusa, K.; Matsumoto, Y.; Miki, T.; Koyama, T.; Shirai, H., *J. Chem Soc. Chem. Comm.*, 1994, 1401-1402.
TheGelation of $CO_2$: A Sustainable Route to the Creation of Microcellular Materials, Shi, C.; Huang, Z.; Kilic, S.; Zu, J.; Enick, R.M.; Beckman, E.J.; Carr,A.J.; Melendez, R.E.; Hamilton, A.D., *Science*, 1999, 286, 1540-1543.
Self-Assembly of Bisurea Compounds in Organic Solvents and on Solid Substrates, van Esch, J.; DeFeyter, S.; Kellogg, R.M.; DeSchryver, F.; Feringa, B.L.; *Chem Eur. J.*, 1997, 3, 1238-1243.
The Design Of Organic Gelators: Solution and Solid State Properties of a Family of Bis-Ureas, Carr, A.J.; Melendez, R.E.; Gieb, S.P.; Hamilton, A.D., *Tet. Lett.*, 1998, 39, 7447-7450.
Cyclic Bis-Urea Compounds as Gelators for Organic Solvents, vab Escgm H,; Schoonbeek, F.; oos, M.d.; Koojiman, H.; Spek, A.L.; Kellogg, R.M.; Feringa, B.L., *Chem. Eur. J.*, 1999, 3, 937-950.

(Continued)

*Primary Examiner*—Daniel S. Metzmaier
(74) *Attorney, Agent, or Firm*—Wood, Phillips, Katz, Clark & Mortimer

(57)    ABSTRACT

Thermoreversible organogelator compositions comprising compounds of the formula:

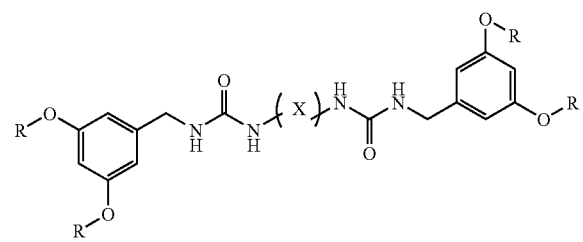

where X is $C_6$ to $C_{12}$ alkylene and R is $C_9$ to $C_{12}$ alkyl, and their methods of use, including forming a gel to immobilize a solvent using the compound. The method can be used to form gels that can be used for the transportation of volatile organic solvents like gasoline, cooking oil, and contaminated organic liquids to be incinerated.

30 Claims, No Drawings

OTHER PUBLICATIONS

Chiral Recognition in Bis-Urea-Based Aggregates and Organogels through Cooperative Interactions, Loos, M.; van Esch, J.; Kellogg, R.M.; Feringa, B.L.; *Agnew Chem. Int. Ed.*, 2001, 40, 613-616.

Reversible Polymers Formed from Self-Copmplementary Monomers Using Quadruple Hydrogen Bonding, Sijbesma, R.P.; Beijer, F.H.; Brunsveld, L.; Folmer, B.J.B.; Hirschberg J.H..K.K.; Lange, R.F.M.; Lowe, J.K.L.; Meijer, E.W.; *Science* 1997, 278, 1601-1604.

Synthesis and Self-Assembling Properties of Polymerizable Oreganogelators; Wang, G., Hamilton, A.D.; *Chem. EuroJ.*, 2002, 8, 1954-1961.

Terephthaloyl Derivatives ad New Gelators; Excellent Gelation Ability and Remarkable Increase of Gel Strength by Adding Polymers, Hanabusa, B.; Itoh, A.; Kimura, M.; Shirai, H.; *Chem Lett.*, 1999, 767-768.

Remarkable Stabilization of Self-Assembled Organogels by Polymerization, de Loos, M.; van Esch, J.M.; Stookroos, I.; Kellogg, R.M.; Feringa, B.L.; *J. Am. Chem. Soc.*, 1997, 119, 12675-12676.

Synthesis and Characterization of Tris-Methacrylated 3,4,5-Tris[(alkoxy)benzyloxy]benzoate Derivatives, Beginn, U.; Zipp , G.; Moller, J.; *Chem. Eur. J.*, 2000, 6, 2016-2023.

Polymerization of a Diacetylene Dicholesteryl Ester Having Two Urethanes in Organic Gel States, Tamaoki, N., Shimada, S., Okada, Y., Belaissaoui, A, Kruk, G., Yase, K., Matsuda, H., *Amer. Chem. Soc.*, 2000, 7545-7547.

Bis[(alkoxy)benzoylsemicarbazides]—a new class of powerful organogelators, Beginn, U.; Tartsch, B.; *Chem. Comm.*, 2003, 310-311.

Introductory Lecture, Aspects Of Polymer Gels, Keller, A.; *Faraday Discuss.*, 1995, 101, 1-49.

Low molecular weight organogelators for water, Wang, G.; Hamilton, A.D., *Chem. Comm. J.*, 2003, 310-311.

An organic hydrogel as a matrix for the growth of calcite crystals, Estroff, L.A.; Addadi, L.; Weiner, S.; Hamilton, A.D., *Org. Bio. Chem.*, 2004, 2, 137-141.

Thermal and Light Control of the Sol-Gel Phase Transition in Cholesterol-Based Organic Gels. Novel Helical Aggregation Modes As Detected by Circular Dichroism and Electron Microscopic Observation, Murata, K.; Aoki, M.; Suzuki, T.; Harada, T.; Kawabata, H.; Komori, T.; Ohseto, F.; Ueda, K.; Shinkai, S. *J. Am. Chem. Soc.*, 1994, 116, 6664-6676.

Di-urea Compounds as Gelators for Organic Solvents, van Esch, J., Kellogg, R.M., Feringa, B.L.; *Tetrahedron Letters*, 1997, 38:2, 281-284.

* cited by examiner

THERMOREVERSIBLE ORGANOGELATORS, COMPOSITIONS AND METHODS OF MAKING THEREOF

FIELD OF THE INVENTION

The present invention relates to thermoreversible organogelator compounds, compositions containing a critical concentration of a thermoreversible organogelator compound and a solvent and methods of forming a gel to immobilize a solvent using the compound. More specifically, the present invention relates to bis-urea compounds.

BACKGROUND OF THE INVENTION

The present invention generally relates to thermoreversible organogelator compounds, compositions thereof and methods of forming gels containing these compounds.

In the past, the gelation phenomena, when observed, was a curiosity and mentioned only briefly in the literature. However, in the last 20 years and in particular the last 5-10 years, scientists have begun to understand the forces involved in the gelation process and have designed many molecules that gel everything from alkanes, like hexane, to supercritical $CO_2$. The use of these molecules is as of yet minimal. However, it is clear that by changing the bulk properties of a solvent/solution, commercial applications are possible.

Thermoreversible organogelators generally contain two or more structural domains of differing complementarity. One of these domains is typically a long alkyl chain and the other domain consists of an amide, urea, amino acid, polyaromatic, steroid, calixarene or carbamate group. These domains aggregate to form sheets or rods. Self-assembled aggregates further associate through the alkyl chains to form fibers. The supramolecular fibers further aggregate through the alkyl chains creating junction zones (semi-crystalline sections) between the fibers. This latter form of aggregation establishes a 3-dimensional network, which immobilizes the solvent and sets the gel. Removal of the solvent consistently causes the collapse of the gel and a loss of the three dimensional network resulting in a xerogel.

Previously, a series of thermoreversible gelators for supercritical $CO_2$, such as compounds 1 and 2, as shown below, have been prepared. Upon removal of the solvent they form microcellular foams which are aerogels, materials that retain the three dimensional network in the absence of a solvent, in contrast to xerogels. The determination of the physical structure of these foams was achieved through scanning electron microscopy (SEM). The morphology of the gels is highly dependent on the structure of the monomer unit comprising the aggregate as well as the concentration under which the aggregate is allowed to form. Examination of the SEM's provides details of the modes of aggregation and allows correlation of the structure of the gel to the thermodynamic behavior.

Certain bis-urea organogelators have been shown to aggregate

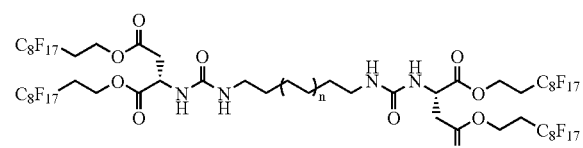

1 n = 1
2 n = 4 through complementary bidentate intermolecular hydrogen bonds where both the NH and C=O groups of the ureas participate in the aggregate growth as evidenced by the IR spectrum. Molecular modeling studies of compound 3 predict that the primary aggregate has rod-like structures (while compound 4 forms sheet-like structures) which assemble into fibers. The structure of compounds 3 and 4 as well as their proposed hydrogen-bonding pattern are shown below. Further evidence for rod formation by self-complementary hydrogen bonding of bis-ureas has been obtained from a single crystal X-ray structure of bis-urea compounds. Further evidence for stacking and a degree of chiral recognition has been observed by CD measurements of an azobenzene derivative of compound 3.

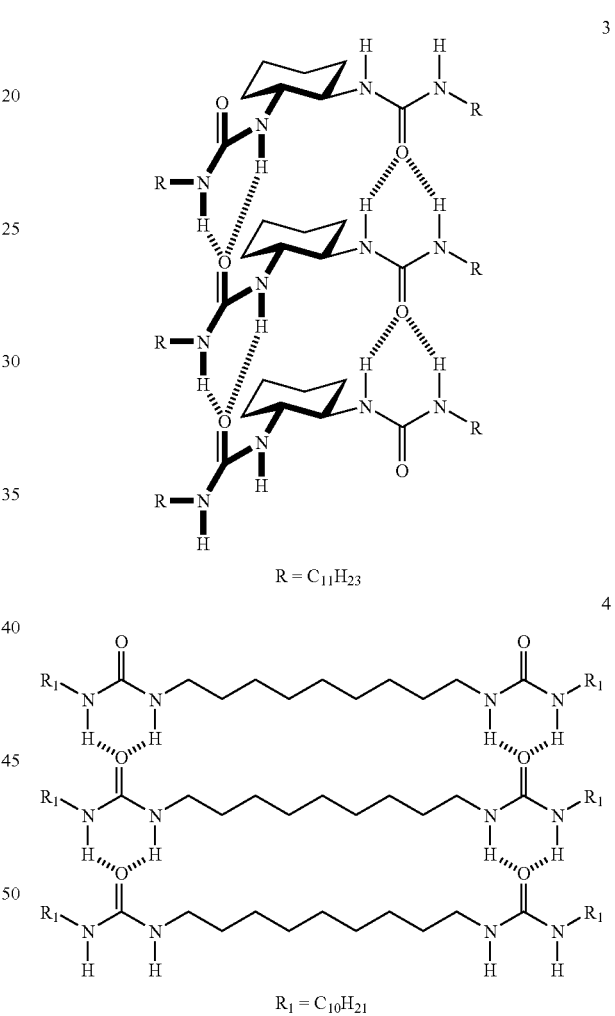

Aggregation through the bis-urea motif creates gels at a lower concentration as compared to other organogelators, due to the structural integrity of the primary aggregate. The stronger the initial aggregate, the longer the rod or sheet can grow, increasing the van der Waals surface area of the aggregate, which is an important factor in determining gel stability. Disruption of this initial aggregate shortens the length of the supramolecular complex, thereby creating less surface area for cross-linking. This shortening decreases the size of the junction zones and changes the thermodynamic behavior of the system.

Thermal stability of the gel relies not only on the strength of the initial aggregation but also on the degree of cross-linking, which is caused by the alkyl tails. Typically, the longer the alkyl tail (larger the van der Waals surface area) the more thermal stability the gel possesses. Junction zones formed from the alkyl tails grow over time due to thermal motion. This leads to time dependence as well as temperature dependence in the thermal stability of the gel and, as a result, the enthalpy of melting is also dependent on these variables.

Additional work has been done to increase the thermal stability of organogels by incorporating covalent crosslinks. One method that has been explored by others in the field is to chemically crosslink the monomeric organogelator after the gel has set. The increased stability comes from the covalent bonds created between the methacrylate fragments on the molecule. Compound 5, as shown below, has an increased thermal stability after photopolymerization of ethyl acetate gels since the pre-irradiation melting temperature of the gel is 40° C. while after irradiation, is more than 110° C. This increase is impressive since ethyl acetate boils at 77° C. However, this degree of stability is not uncommon in polymerized gels. Locking the structure by polymerization gives rise to aerogels upon solvent removal. But since the structure is now covalently crosslinked, it is no longer thermoreversible.

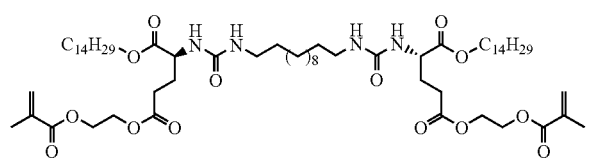

5

In addition to bis-ureas, bis-semicabazides like compound 6, as shown below, are known to gel organic liquids. This class of gelator has been shown to gel organic liquids in the range of 20 wt % to 0.6 wt % depending on the solvent and the exact gelator used. Of particular note is that this type of gelator when dissolved in N,N-dimethylacetamide (DMA) at 33 wt % can be used to gel less polar solvents. By diluting the gelator-DMA mixture with a less polar solvent, a gel will form and heating of the less polar solvent is avoided.

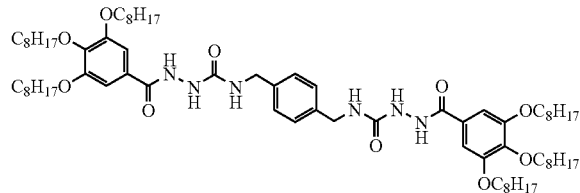

6

The same principle and forces that are utilized in organogelation are used for hydrogelation (gelation of water). Like organogelation, work in this area is extensive and has been ongoing for a significantly longer time. So far, there are only two examples of hydrogelators: a monourea of compound 7 and a bis-urea of compound 8, both shown below. These molecules have ionizible side chains that can hydrogen bond with water and impart a low degree of solubility in warm water. Critical concentrations, the minimum amounts of the compound in a solvent at which fluidic motions of the solvent stops, vary from 0.8 to 2 wt %. Compound 7 is one of the smallest low molecular weight hydrogelators known to date. Compound 8 was initially designed as a model system for the biomineralization of calcite.

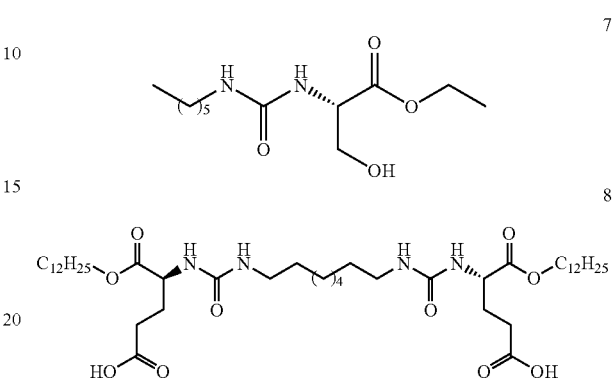

Therefore, it is a challenge to provide a compound that is stable, is disruptable or thermoreversible when it encloses a variety of solvents to form a gel composition, and has a low critical concentration. Using a low critical concentration for the compound to immobilize a solvent is cost efficient because a small amount of the compound is needed to form a gel.

BRIEF SUMMARY OF THE INVENTION

The present invention is directed to thermoreversible organogelator compounds, compositions containing a thermoreversible organogelator compound and a solvent and a method of forming a gel to immobilize a solvent by adding a critical concentration of the compound to the solvent. More specifically, the present invention is directed to bis-urea compounds as shown herein.

The compounds of the present invention have the formula:

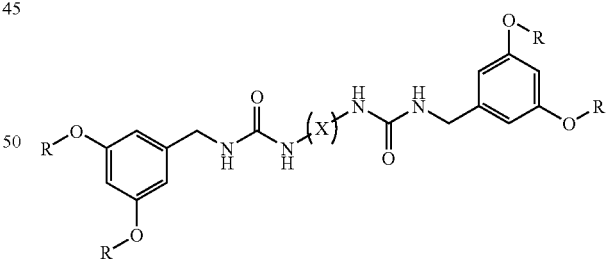

where X is $C_6$ to $C_{12}$ alkylene, each R is $C_9$ to $C_{12}$ alkyl, provided that when X is $C_6$ alkylene, each R must be $C_{10}$ alkyl.

In a preferred embodiment of the present invention, each R is $C_{10}$ alkyl.

In a more preferred embodiment of the present invention, each R is $C_{10}$ alkyl and X is $C_6$ alkylene or $C_{12}$ alkylene.

In another preferred embodiment of the present invention, each R is $C_{12}$ alkyl.

In a more preferred embodiment of the present invention, each R is $C_{12}$ alkyl and X is $C_{12}$ alkylene.

The compositions of the present invention comprise:
a compound of the formula:

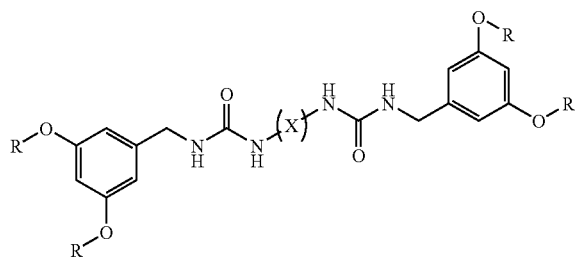

where X is $C_6$ to $C_{12}$ alkylene and each R is $C_9$ to $C_{12}$ alkyl; and
a solvent,
wherein the composition is at a critical concentration and the critical concentration is the minimum amount of the compound in the solvent at which fluidic motion of the solvent stops.

In a preferred embodiment of the present invention, the solvent in the composition is pentane, n-hexane, heptane, octane, nonane, decane, undecane, dodecane, hexadecane, acetone, benzene, canola oil, chloroform, cyclohexane, dichloromethane, N,N-dimethylformamide, absolute ethanol, ethylene glycol, ethyl acetate, iso-octane, hexadecane, methanol, toluene, n-propanol, 1-propanol, 2-propanol, mineral oil, vegetable oil, gasoline, cylcohexanol, octyl alcohol, n-amyl alcohol, benzyl alcohol, tert-amyl, sec-butyl, alcohol, hexyl alcohol, n-butyl alcohol, tetrahydrofuran, dimethyl sulfoxide or glycerine.

In a more preferred embodiment of the present invention, the solvent n the composition is pentane, n-hexane, heptane, octane, nonane, decane, undecane, dodecane, hexadecane, canola oil, acetone, methanol, ethanol, 1-propanol, 2-propanol, mineral oil, tetrahydrofuran, dichlormethane, chloroform, toluene, dimethyl sulfoxide, N,N-dimethylformamide, ethylene glycol, ethyl acetate, iso-octane, glycerine, cyclohexane or benzene.

In a further preferred embodiment of the present invention, the solvent in the composition is ethanol, dichloromethane, dimethyl sulfoxide or tetrahydrofuran.

In a most preferred embodiment of the present invention, each R is $C_{10}$ alkyl, X is $C_6$ alkylene and the solvent in the composition is pentane with a critical concentration of about 4.9 weight percent, n-hexane with a critical concentration of about 0.31 weight percent, heptane with a critical concentration of about 1.3 weight percent, octane with a critical concentration of about 0.91 weight percent, nonane with a critical concentration of about 0.42 weight percent, decane with a critical concentration of about 0.07 weight percent, undecane with a critical concentration of about 0.07 weight percent, dodecane with a critical concentration of about 0.06 weight percent or hexadecane with a critical concentration of about 0.05 weight percent.

In another most preferred embodiment of the present invention, each R is $C_{10}$ alkyl, X is $C_{12}$ alkylene and the solvent in the composition is either pentane with a critical concentration of about 3.4 weight percent, n-hexane with a critical concentration of about 0.20 weight percent, heptane with a critical concentration of about 0.72 weight percent, octane with a critical concentration of about 0.09 weight percent, decane with a critical concentration of about 0.08 weight percent, undecane with a critical concentration of about 0.07 weight percent, dodecane with a critical concentration of about 0.06 weight percent or hexadecane with a critical concentration of about 0.05 weight percent.

Finally, the present invention is also directed to a method of forming a gel to immobilize a solvent including the steps of:
providing a critical concentration of a composition by adding to a hazardous solvent, a compound of the formula:

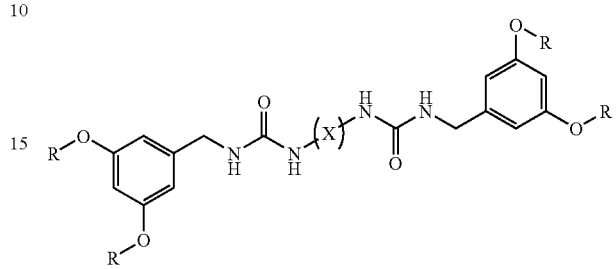

where X is $C_6$ to $C_{12}$ alkylene and each R is $C_9$ to $C_{12}$ alkyl and wherein the critical concentration is the minimum amount of the compound in the solvent at which fluidic motion stops.

DETAILED DESCRIPTION OF THE INVENTION

Other than in the claims and in the operating examples, or where otherwise indicated, all numbers expressing quantities of ingredients or reaction conditions used herein are to be understood as being modified in all instances by the term "about".

The term "thermoreversible" is defined as being reversible by the application of heat. More specifically with respect to the invention, the gelation process, or the forming of the gel, is reversible by the application of heat. This process can be demonstrated by other related applications of heat, such as sonification, where the gel structure is disrupted. Specifically, with respect to the gels or compositions of the present invention, heat is applied to melt the gel or disrupt the macromolecular structure of the gel, and as the solvent cools, the gel will reform. This phenomenon occurs repeated and indefinitely until the solvent is evaporated due to the heat.

The term "organogelator" is defined as an organic compound that encloses a solvent to form a gel, such as the compounds of the present invention.

The phrase "gelling agents", "gelators" or "organogellators" also refers to compounds used in the compositions to form a gel. Therefore, the "new gelling agents", the "new gelators" or the "new organogellators" also refer to the compounds according to the present invention.

The phrase "hazardous solvent" refers to any solvent that can be considered a dangerous material or a hazardous material. Such solvents may be, but are not limited to, solvents that are flammable or explosive, such as gasoline or oil, or other environmentally unsafe materials.

The term "alkyl" refers to a hydrocarbon group derived from an alkane.

The "C" and its subscript which precede "alkyl" will designate the number of carbon atoms in the alkyl group. For example, $C_{12}$ alkyl will mean a hydrocarbon group that has 12 carbons atoms.

The phrase "critical concentration" as used herein is defined as the minimum amount of a compound in a solvent at which fluidic motion of the solvent stops.

The phrase "fluidic motion" is defined as when a material acts in a dynamic way and flows as in a liquid state. This "fluidic motion" can be characterized by a process of determining the critical concentration of a compound in the composition of the present invention, as demonstrated in a method described herein. However, this phenomenon can be demonstrated by other equivalent methods to the method as described below. As further discussed below, at the critical concentration, a solvent which is enclosed by a compound in a composition of the present invention, is said to behave like a solid because the composition does not move when the test tube, or other vessels, which contains the composition, is inverted. When this happens, this phenomenon is characterized as when "fluidic motion stops".

As used herein, "tail length" or "tailed" means the alkyl length of R and "linker length" or "linked" means the alkyl length of X in the compound of the present invention.

The compounds of the present invention may be referred to by tail length and linker length, i.e., $C_9$-$C_6$ or $C_9$-$C_{12}$. The first designation in the compound is the tail length and the second designation in the compound is the linker length. For example, for compound $C_9$-$C_6$, the compound has a tail length of $C_9$ and a linker length of $C_6$. In other words, the compound has $C_9$ alkyl for R and has $C_6$ alkyl for X.

In a first embodiment, the present invention relates to new compounds that are thermoreversible organogelators/gelling agents. Specifically, the present invention relates to bis-urea compounds having a specific tail length (R) and a specific linker length (X).

The new compounds, i.e., new gelling agents of the present invention have the formula:

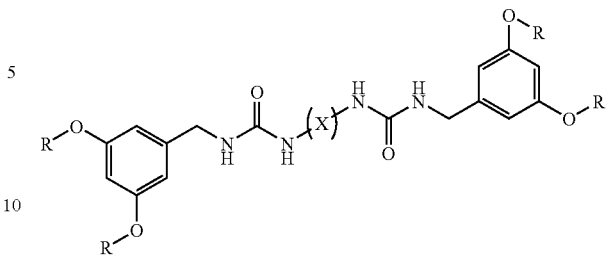

where X is $C_6$ to $C_{12}$ alkylene, each R is $C_9$ to $C_{12}$ alkyl, provided that when X is $C_6$ alkylene, each R must be $C_{10}$ alkyl. In a preferred embodiment, each R is $C_{10}$ alkyl and most preferably, each R is $C_{10}$ alkyl and X is $C_6$ alkylene or $C_{12}$ alkylene. In another preferred embodiment, each R is $C_{12}$ alkyl. In the most preferred embodiment, each R is $C_{12}$ alkyl and X is $C_{12}$ alkyl.

Methods for synthesizing the new compounds of the present invention are shown in the Scheme below. The method uses five steps. Through these five steps, it is possible to transform the starting material into the desired product. Reagents that can be used in these steps are: i) BrR, $K_2CO_3$, DMF; ii) LAH, ether; iii) 1: $SOCl_2$, DMF, Pyridine, $CH_2Cl_2$, and 2: $NaN_3$, DMF; iv) Pd/$CH_{2(g)}$ methanol/ether; and v) 1: 1,6-diisocyanatohexane or 1,12-diisocyanatododecane in $CH_2Cl_2$, and 2: Acetone.

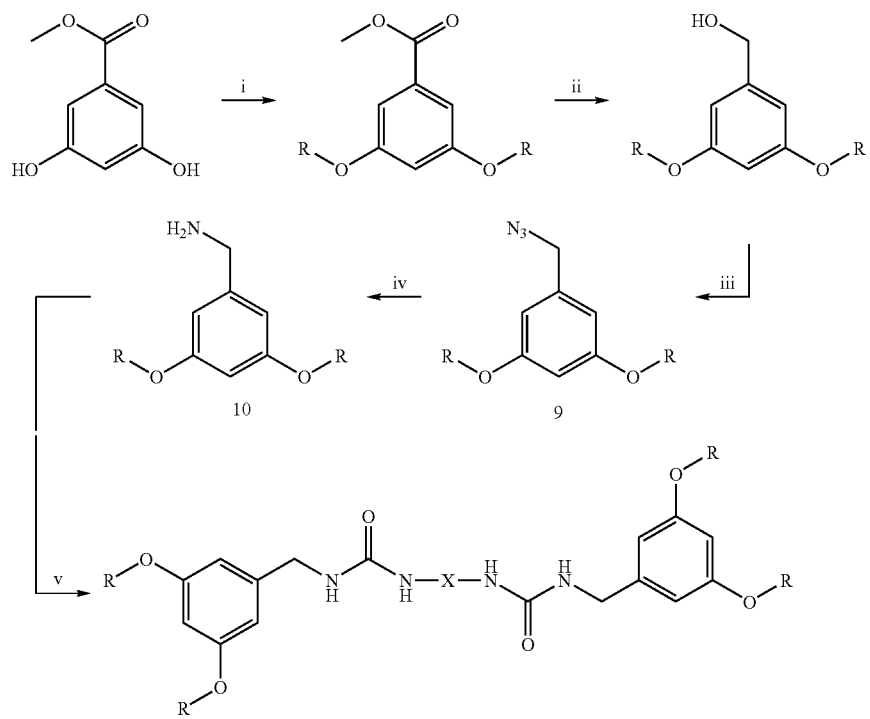

Different derivatives of the new compounds can be made by changing the alkyl bromide compound used in the alkylation of the phenols in step i.

In a second embodiment, the present invention relates new compositions comprising:

a compound of the formula:

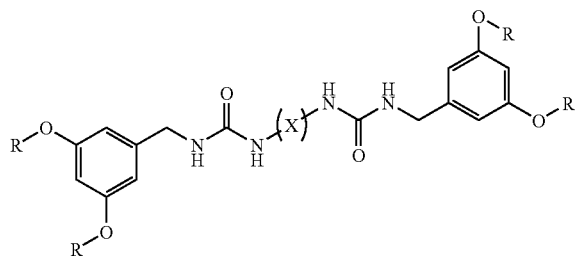

where X is $C_6$ to $C_{12}$ alkylene and each R is $C_9$ to $C_{12}$ alkyl; and a solvent, wherein said composition is at a critical concentration and said critical concentration is the minimum amount of said compound in said solvent at which fluidic motion of said solvent stops.

These new compositions are thermoreversible gels. Methods of determining whether a composition/gel is thermoreversible are known in the art. An example of such methods is sonification, which is described in the accompanying examples below.

Solvents that can be used in the composition include any solvent that is enclosed by a compound resulting in the stopping of fluidic motion of the solvent at a critical concentration of the compound, as described above. These solvents can be those deemed generally as hazardous solvents. Examples of solvents that can be used in the composition include pentane, h-hexane, heptane, octane, nonane, decane, undecane, dodecane, hexadecane, acetone, benzene, canola oil, chloroform, cyclohexane, dichloromethane, N,N-dimethylformamide, absolute ethanol, ethylene glycol, ethyl acetate, iso-octane, hexadecane, methanol, toluene, n-propanol, 1-propanol, 2-propanol, mineral oil, vegetable oil, gasoline, cyclohexanol, octyl alcohol, n-amyl alcohol, benzyl alcohol, tert-amyl, sec-butyl, alcohol, hexyl alcohol, n-butyl alcohol, tetrahydrofuran, dimethyl sulfoxide or glycerine. Preferably, the solvents are ethanol, dichloromethane, dimethyl sulfoxide or tetrahydrofuran.

The type of compound and the type of solvent necessary to form the new composition will depend upon the kind of composition being formed and the specific application of the composition/gel. For example, the specific application of the composition/gel can be simply for containment of a solvent or for transporting a hazardous solvent, etc.

Once the specific application has been decided upon, the specific amount of the compound and the solvent used to form the new composition/gel are based on the critical concentration. As defined above, the critical concentration is the minimum amount of a compound in a solvent at which fluidic motion stops. The critical concentration of a solvent which is enclosed by a compound in a composition can be determined by finding the concentration at which a test tube or other vessels containing the composition can be inverted and the composition does not move. When this happens, this phenomenon is characterized as when "fluidic motion stops".

Representative preferable compositions according to the present invention are those in which each R is $C_{10}$ alkyl and X is $C_6$ alkylene and the solvent is pentane with a critical concentration of about 4.9 weight percent, n-hexane with a critical concentration of about 0.31 weight percent, heptane with a critical concentration of about 1.3 weight percent, octane with a critical concentration of about 0.91 weight percent, nonane with a critical concentration of about 0.42 weight percent, decane with a critical concentration of about 0.07 weight percent, undecane with a critical concentration of about 0.07 weight percent, dodecane with a critical concentration of about 0.06 weight percent or hexadecane with a critical concentration of about 0.05 weight percent; and those in which each R is $C_{10}$ alkyl and X is $C_{12}$ alkylene and the solvent is pentane with a critical concentration of about 3.4 weight percent, n-hexane with a critical concentration of about 0.20 weight percent, heptane with a critical concentration of about 0.72 weight percent, octane with a critical concentration of about 0.09 weight percent, decane with a critical concentration of about 0.08 weight percent, undecane with a critical concentration of about 0.07 weight percent, dodecane with a critical concentration of about 0.06 weight percent or hexadecane with a critical concentration of about 0.05 weight percent.

In another embodiment, the present invention relates to a method of forming a gel to immobilize a solvent comprising providing a critical concentration of a composition by adding a compound of the formula:

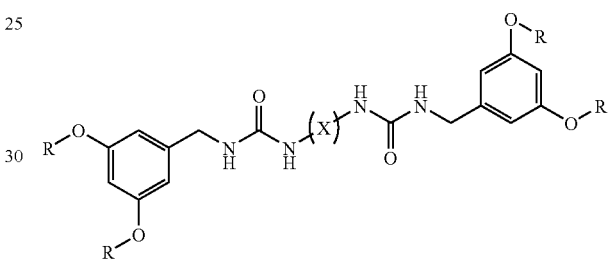

wherein X is $C_6$ to $C_{12}$ alkylene and each R is $C_9$ to $C_{12}$ alkyl, to a solvent that is deemed hazardous, wherein said composition is at a critical concentration and said critical concentration is the minimum amount of said compound in said solvent at which fluidic motion of said solvent stops.

This method can be used to form gels that can be used for the safe transportation of volatile organic solvents like gasoline, cooking oil, and contaminated organic liquids heading for incineration. The compounds used are thermoreversible organogelators that will solidify organic liquids. The transportation of these solvents is made safer by decreasing the movement of the solvents according to the method of the present invention, such as decreasing the sloshing of gasoline in tanker trucks. Additionally, the hazardous solvents are more readily contained in the case of spillage. Since the method of the present invention uses thermoreversible compounds, recycling, incineration and disposal of the hazardous solvents and/or the compounds are facilitated.

The invention will be understood more clearly from the following non-limiting representative examples.

EXAMPLE 1

Synthesis and Characterization of Two $C_{10}$-Tailed Bis-urea Organogelators (Two Compounds where R is $C_{10}$ Alkyl)

Two bis-urea organogelator molecules of the formula $[(3,5-OR)C_6H_3(CH_2NHC(=O)NH]_2X$ where $R=C_{10}H_{21}$ and $X=C_6H_{12}$ or $C_{12}H_{24}$ were synthesized. The compounds were synthesized by the methyl esterification of 3,5-dihydroxybenzoic acid under acidic conditions (81% yield). The phenols on the synthesized ester were alkylated with 1-bromododecane (72% yield). The methyl ester functional group was then reduced to a benzyl alcohol using lithium aluminum hydride in good yield (81%). The alcohol was subsequently converted to a chloride (71% yield) and then an azide (80% yield). The benzyl azide was reduced to a benzyl amine in excellent yield (97%) by catalytic hydrogenation. Treatment of 1,6-diisocyanatohexane and 1,12-diisocyanatododecane with excess amine generated the bis-urea compounds (70% and 65% yield respectively). The critical concentrations (CC) for the gelation of a wide range of organic solvents were determined. Within the alkane solvents (hexane, heptane, etc.), the CC for gelation reached sub-millimolar levels and follows a linear trend with respect to the reciprocal boiling point of the solvent.

EXAMPLE 2

Synthesis and Characterization of Two $C_{12}$-Tailed Bis-urea Organogelators (Two Compounds Where R is $C_{12}$ Alkyl)

Two bis-urea organogelator molecules of the formula $[(3,5-OR)C_6H_3(CH_2NHC(=O)NH)]_2X$ where $R=C_{12}H_{25}$ and $X=C_6H_{12}$ or $C_{12}H_{24}$ were synthesized. The compounds were synthesized starting from the alkylation of methyl 3,5-dihydroxybenzoate with 1-bromododecane (94% yield). The methyl ester functional group was then reduced to a benzyl alcohol using lithium aluminum hydride in excellent yield (94%). The alcohol was subsequently converted to a chloride and then an azide without isolation of the intermediate chloride. This significantly improved the overall yield of the azide over previous methods (88% yield). The benzyl azide was reduced to a benzyl amine in excellent yield (97%) by catalytic hydrogenation. Treatment of 1,6-diisocyanatohexane and 1,12-diisocyanatododecane with excess amine generated the bis-urea compounds (80% and 82% yield, respectively). The critical concentrations (CC) for the gelation of an alkane solvents were determined. Within this series of solvents (hexane, heptane, etc.), the CC for gelation reached sub-millimolar levels and requires less material than any other gelator in the series to set a gel.

The following are examples of the synthesis of derivatives and the synthesis of the $C_9$-tailed compounds (compounds where R is $C_9$ alkyl) from those derivatives.

EXAMPLE 3

Synthesis of Methyl 3,5-dinonyloxy Benzoate

In a 1 L round bottom flask (RBF) containing a stir bar and dimethylformamide (DMF); methyl 3,5-dihydroxylbenzoate (15 g, 89.2 mmol), potassium carbonate (37 g, 0.2677 M), 1-bromononane (37.36 ml, 0.1658 M), and DMF (100 mL) were added. The reaction was sealed with a septum and stirred overnight. By the end of the reaction period (15 hours), the reaction had turned from a pale yellow suspension to a dark green suspension. The dark green reaction mixture was then added to 1 L of distilled water and ice. When the ice melted, the mixture was extracted 4 times with ether (300 mL). The ether layers were combined, dried with magnesium sulfate and gravity filtered. The solvent was removed under reduced pressure. The resulting oil was then diluted with about 800 mL methanol and heated on a hotplate for 1 hour on medium heat. The mixture was allowed to cool slowly overnight. The mixture was placed in a refrigerator for 1 hour and then the top layer was decanted off into a 1 L RBF, and rapid crystallization occurred. The crystals were placed in a refrigerator overnight then vacuum filtered and air-dried. There was a 27.4 g yield or a 74.1% yield of the derivative. The NMR characterization data for this derivative is as follows. $^1$H NMR (CDCl$_3$): 0.88 (t, J=6.3, 6H, CH$_2$C$\underline{H}_3$), 1.1-1.55 (m, 28H, CH$_2$(C$\underline{H}_2$)$_6$), 1.76 (p, J=6.6, 4H, OCH$_2$C$\underline{H}_2$), 3.89 (s, 3H, OC$\underline{H}_3$), 3.96 (t, J=6.3, 4H, OC$\underline{H}_2$CH$_2$), 6.63 (t, J=2.2, 1H, Ar$\underline{H}$), 7.15 (d, J=2.2, 2H, Ar$\underline{H}$). $^{13}$C (75 MHz, CDCl$_3$): 14.21, 22.77, 26.09, 29.26, 29.36, 29.46, 29.62, 31.97, 52.28, 68.37, 76.70, 77.13, 77.32, 77.55, 106.61, 107.65, 131.84, 160.20, 167.09.

EXAMPLE 4

Synthesis of 3,5-dinonoxybenzyl Alcohol

To a flame dried 1 L RBF containing a stir bar, lithium aluminum hydride (2.166 g, 57.0 mmol) was added. The RBF was placed in an ice bath and the reaction was capped with a septum containing a nitrogen gas line and an out-vent. Dry ether (10 mL) was added through the septum while the mixture was stirring. Methyl 3,5-dinonyloxybenzoate (20 g, 47.5 mmol) was added and dissolved in 60 mL dry ether, drop-wise through the septum. After this addition, the reaction mixture became clumpy and would not stir so about 150 mL more of dry ether was added to dilute the mixture. After 1 hour, the nitrogen line and the out-vent were removed and the septum was changed. The mixture was stirred overnight. The RBF was then placed in an ice bath. Distilled water (150 mL) was added drop-wise through the septum until the mixture turned a white-grey color. The reaction mixture was allowed to stir at room temperature for 10 minutes and then 100 mL 1M hydrochloric acid was added until the pH reached less than 2. The mixture was then extracted with ether 4 time (200 mL) and the ether layers were combined and then washed with 200 mL distilled water, then with 200 mL aqueous sodium carbonate (5%), then with 200 mL distilled water, then with 200 mL brine, and then dried with magnesium sulfate and gravity filtered. The solvent was removed under reduced pressure, producing a waxy white solid. The solid was air dried overnight. The solid was purified by silica gel flash chromatography using a solvent system of 1 L 20% ether and hexanes and 2 L 40% ether and hexanes. The product was collected and the solvent was removed under reduced pressure. The resulting oil was covered with the septum and allowed to stand over night where it is partially solidified. There was a 13.22 g yield or a 71.8% yield of the derivative. The NMR characterization data for this derivative is as follows. $^1$H NMR (300 MHz, CDCl$_3$): 0.88 (t, J=6.3, 6H, CH$_2$C$\underline{H}_3$), 1.1-1.55 (m, 28H, CH$_2$(C$\underline{H}_2$)$_6$), 1.76 (p, J=6.6, 4H, OCH$_2$C$\underline{H}_2$), 3.92 (t, J=7.0, 4H, OC$\underline{H}_2$CH$_2$), 4.62 (d, J=6.1, 2H, CHC$\underline{H}_2$CH), 5.29 (s, 1H, CH$_2$O$\underline{H}$), 6.63 (t, J=2.2, 1H, Ar$\underline{H}$), 7.15 (d, J=2.2, 2H, Ar$\underline{H}$). $^{13}$C (75 MHz, CDCl$_3$): 160.54, 143.33, 105.07, 100.54, 68.12, 31.98, 29.65, 29.50, 29.37, 29.35, 26.14, 22.78, 14.21.

EXAMPLE 5

Synthesis of 3,5-dinonoxybenzyl Chloride

A 1 L RBF was prepared containing 5 mL dry dichloromethane, a stir bar, a septum, an out-vent line and a nitrogen gas line. DMF (3.3 ml, 40.3 mmol) was added and the reaction mixture was cooled in an ice bath. Thionyl chloride (2.7 ml, 40.3 mmol) was added and the reaction mixture was stirred for 10 minutes. The ice bath was then removed and the reaction mixture was allowed to stir for an additional 10 minutes. The RBF was placed in an ice bath and a mixture of pyridine (2.72 ml, 33.6 mmol) and 3,5-dinonoxybenzylalcohol (13.2 g, 33.6 mmol) were added and dissolved in about 50 mL dichloromethane, drop-wise through the septum. After 15 minutes, the RBF was removed from the ice bath and the reaction was stirred for 2 hours after which the reaction mixture was placed in the refrigerator overnight. The solvent was removed by rotary evaporation. To the remaining organic matter, 100 mL of 50% ether/hexanes was added to dissolve the desired compound. A solid orange precipitate formed, the remaining liquid was decanted off and the precipitate was washed with an additional 100 mL of 50% ether/hexanes. The combined organic layers were vacuum filtered through a silica gel into a RBF and the solvent was removed under reduced pressure. The trace solvent was removed by high vacuum overnight. There was a 10.0 g yield or a 72.2% yield of the derivative. The NMR characterization data for this derivative is as follows. $^1$H NMR (300 MHz, CDCl$_3$): 0.88 (t, J=6.3, 6H, CH$_2$CH$_3$), 1.1-1.55 (m, 28H, CH$_2$(CH$_2$)$_6$), 1.76 (p, J=6.6, 4H, OCH$_2$CH$_2$), 3.93 (t, J=6.6, 4H,), 4.50 (d, J=5.8, 2H, CH$_2$Cl), 6.39 (t, J=2.2, 1H, ArH), 6.51 (d, J=2.2, 2H, ArH).

EXAMPLE 6

Synthesis of 3,5-dinonoxybenzyl Azide

Sodium azide (3.25 g, 50.0 mmol) and DMF (25 mL) were introduced into a 1 L RBF containing 3,5-dinonoxybenzylchloride (10.0 g, 25.0 mmol) and a stir bar. The reaction mixture was then capped with a septum and an out-vent needle. The mixture was heated until warm to touch, allowed to cool to room temperature, then heated again (repeated 4 times). The mixture was then transferred to a separatory funnel and diluted with 500 mL distilled water and washed with ether (4 times using 100 mL). The combined ether layers were washed with ammonium chloride (2 times with 50 mL), then dried with magnesium sulfate and gravity filtered into a 1 L RBF. The solvent was removed under reduced pressure and the trace solvent was removed with a high vacuum. The compound was purified by flash column chormatography (silica gel using 1 L pure hexanes, 1 L 5% ether and hexanes, 1 L 10% ether and hexanes). The product was present in all fractions, the solvent was removed by rotary evaporation and then the trace solvent was removed by a high vacuum. The resulting yellow oil was dissolved in 400 mL ethanol and placed in a freezer overnight. Extreme crystal growth was present in the morning. The mixture was then vacuum filtered and the crystals were collected and air dried while the filtrate was placed in the freezer. Analysis of the crystals indicates they are impurities. As a result, the solvent was removed from the filtrate using rotary evaporation and the trace solvent was then removed using high vacuum. There was a 5.3 g yield or a 51.4% yield of the derivative. The NMR characterization data for this derivative is as follows. $^1$H NMR (300 MHz, CDCl$_3$): 0.88 (t, J=6.3, 6H, CH$_2$CH$_3$), 1.1-1.55 (m, 28H, CH$_2$(CH$_2$)$_6$), 1.76 (p, J=6.6, 4H, OCH$_2$CH$_2$), 3.93 (t, J=6.6, 4H,), 4.24 (s, 2H,) 6.42 (q, J=2.2, 1H, ArH). $^{13}$C (75 MHz, CDCl$_3$): 160.68, 137.45, 106.52, 101.10, 68.19, 55.01, 31.95, 31.02, 29.47, 29.34, 29.31, 26.12, 22.76, 14.20.

EXAMPLE 7

Synthesis of 3,5-dinonoxybenzyl Amine

A thick walled glass bottle containing a stir bar was flushed with nitrogen gas. 5% Palladium on activated carbon (0.53 g, 10% by mass) was added and wetted with a solution of 50% methanol/ether (about 10 mL). A solution of 3,5-dinonoxybenzylazide (5.3 g, 12.68 mmol) in 50% methanol/ether (about 40 mL) was added. The mixture was hydrogenated with hydrogen gas at 40 psi for approximately 1 hour. The mixture was then filtered through celite with a controlled vacuum using.50% methanol/ether. The solvent was removed from the filtrate under reduced pressure and then the trace solvent was removed with using high vacuum. The starting material was still present in the resulting organic oil, so hydrogenation and celite filtration were repeated until there is no azide remained (3 times). There was a 7.3 g yield or a 62.26% yield of the derivative. The NMR characterization data for this derivative is as follows. $^1$NMR (300 MHz, CDCl$_3$): 0.88 (t, J=6.3, 6H, CH$_2$CH$_3$), 1.1-1.55 (m, 28H, CH$_2$(CH$_2$)$_6$), 1.76 (p, J=6.6, 4H, OCH$_2$CH$_2$), 3.78 (s, 2H,), 3.95 (t, J=6.6, 4H,), 6.33 (t, J=2.2, 1H, ArH), 6.44 (d, J=2.2, 2H, ArH).

EXAMPLE 8

Synthesis of C$_9$-C$_6$ Compound (Compound Where R is C$_9$ Alkyl and X is C$_6$ Alkylene)

To a 1 L RBF 3,5-dinonoxybenzylalamine with a stir bar was added a solution of dinonoxybenzylamine (3.3 g, 8.43 mmol) in approximately 100 mL dichloromethane. The RFF was then sealed with a septum. 1,6-diisocyanatohexane (0.619 ml, 3.83 mmol) was added to the mixture through the septum. A reaction was allowed to take place and the reactants were stirred until white strands formed and the reactants solidified. Dichloromethane (approximately 50 mL) was added and the mixture was heated until the solution became clear. The reactants were stirred at room temperature until the reaction mixture became thick or solidified. Heating was repeated until the reaction mixture would not completely solidify (approximately 6 times). The resulting white solid in the flask was collected by vacuum filtration and allowed to air dry. There was a 2.63 g yield or a 72.2% yield of the compound. The NMR characterization data for the compound is as follows. $^1$NMR (300 MHz, CDCl$_3$): 0.88 (t, J=6.3, 6H, CH$_2$CH$_3$), 1.1-1.55 (m, 26H, CH$_2$(CH$_2$)$_6$), 1.76 (p, J=6.6, 4H, OCH$_2$CH$_2$), 3.17 (q, J=6.1, 2H, CH$_2$CH$_2$NH), 3.86 (t, J=6.6, 4H, ArOCH$_2$CH$_2$)), 4.22 (d, J=5.5, 2H, ArCH$_2$NH), 4.74 (t, J=5.5, 1H, NH), 4.96 (t, J=5.5, 2H, NH), 6.30 (t, J=2.2, 2H, ArH), 6.39 (d, J=2.2, 2H, ArH). $^{13}$C (75 MHz, CDCl$_3$): 160.50, 158.84, 141.81, 105.74, 99.90, 68.05, 44.54, 39.67, 31.98, 29.82, 29.66, 29.55, 29.39, 26.16, 25.69, 22.78, 14.21. Analysis calculated for C$_{58}$H$_{102}$N$_4$O$_6$: C, 73.22; H, 10.81; N, 5.89. Found C, 72.26; H, 10.72; N, 6.02. The melting point was at 88-90° C.

EXAMPLE 9

Synthesis of C$_9$-C$_{12}$ Compound (Compound Where R is C$_9$ Alkyl and X is C$_{12}$ Alkylene)

In a 1 L RBF 3,5-dinonoxybenzylamine (4.0 g, 10.2 mmol) was dissolved in approximately 100 mL dichloromethane. A stir-bar and a septum were added. 1,12-diisocyanatododecane (1.24 ml, 4.64 mmol) was added to the reaction through the septum. The reaction mixture was stirred until white strands began to form and the reaction mixture solidified. At this time, approximately 50 mL of dichloromethane was added and the reaction mixture was heated until all of the solids dissolved. The reaction mixture was stirred at room temperature until the mixture began slowing or solidified. Heating and dilution were repeated until the reaction mixture would not solidify completely. The white solid in the reaction mixture was collected by filtration and allowed to air dry. There was a 3.5 g yield or a 72.9% yield of the compound. The NMR characterization data for the compound is as follows. $^1$NMR (300 MHz, CDCl$_3$): 0.88 (t, J=6.3, 12H, CH$_2$CH$_3$), 1.1-1.6 (m, 54H, CH$_2$(CH$_2$)$_6$), 1.74 (p, J=6.6, 8H, OCH$_2$CH$_2$), 3.13 (q, J=6.1, 2H,), 3.89 (t, J=6.6, 4H,), 4.26 (d, J=5.5, 2H,), 4.39 (t, J=5.5, 1H,), 4.68 (t, J=5.5, 1H,), 6.33 (s, 1H,), 6.41 (d, J=2.2, 2H, ArH). $^{13}$C (75 MHz, CDCl$_3$): 160.55, 158.59, 141.68, 105.71, 99.98, 68.06, 44.68, 40.57, 31.98, 30.25, 29.66, 29.54, 29.39, 29.23, 26.84, 26.14, 22.78, 14.22. Analysis calculated for C$_{64}$H$_{114}$N$_4$O$_6$: C, 74.23; H, 11.10; N, 5.41. Found C, 74.24; H, 11.28; N, 5.45. The melting point was at 83-85° C.

The following are examples of the synthesis of derivatives and the synthesis of the C$_{10}$-tailed compounds (compounds where R is C$_{10}$ alkyl) from those derivatives.

EXAMPLE 10

Synthesis of methyl-3,5-didecoxybenzoate

To a 1 L round bottom flask (RBF), while stirring with a magnetic stir bar, 1-bromodecane (54.3 mL, 0.262 mol), dimethylformamide (DMF) (200 mL), and potassium chloride (49.3 g, 0.357 mol) were added. Methyl-3,5-dihydroxybenzoate (20.0 g, 0.119 mol) was dissolved in DMF (100 mL) and the solution was added to the 1 L RBF. The solution gradually changed from an opaque pale yellow to an opaque light grey. The reaction vessel was sealed with a rubber septum and was stirred overnight. After stirring for approximately 20 hours, the contents of the RBF changed to a dark grey color and solidified. The RBF was gently heated with a heat gun until the contents liquefied. After cooling to just above room temperature, the contents of the RBF were transferred into a 2 L Erlenmeyer Flask that contained 1 L of 30/70 ice/distilled H$_2$O mixture. A white precipitate formed on contact with H$_2$O. Vacuum filtration was used to isolate the precipitate. The white precipitate was recrystallized from absolute ethanol (800 mL) and allowed to cool slowly overnight. The contents were then vacuum filtered yielding fine bright white fibrous crystals. The filtrate was concentrated under reduced pressure to approximately 300 mL. The concentrated filtrate was warmed and then left in refrigerator for approximately 18 hours. A second crop of fine bright white fibrous crystals was isolated from the solution upon vacuum filtration. The remaining pale yellow colored filtrate was discarded. This gave a total of 51.5 g yield or a 96.5% yield of the derivative. The NMR characterization data for this derivative is as follows. $^1$NMR (300 MHz, CDCl$_3$): 0.88 (t, J=6.6, 6H, CH$_2$CH$_3$), 1.27-1.44 (m, 28H, CH$_2$(CH$_2$)$_7$), 1.80 (p, J=6.9, 4H, OCH$_2$CH$_2$), 3.89 (s, 3H, OCH$_3$), 3.93 (t, J=6.6, 4H, OCH$_2$CH$_2$), 6.63 (t, J=2.2, 1H, ArH), 7.15 (d, J=2.5, 2H, ArH). $^{13}$C NMR (75 MHz, CDCl$_3$): 14.22, 22.78, 26.10, 29.26, 29.42, 29.45, 29.65, 31.99, 52.27, 68.37, 77.31, 106.61, 107.65, 131.86, 160.21, 167.08.

EXAMPLE 11

Synthesis of 3,5-didecoxybenzyl Alcohol

To a 250 mL flame dried RBF, lithium aluminum hydride (LAH) (2.21 g, 58.2 mmol) and a magnetic stir bar were added. The flask was sealed with a rubber septum into which N$_2$ inlet/outlet needles were added. Dry ether (10 mL) was added via a syringe to the RBF to wet the LAH. Some gas was evolved. Methyl-3,5-didecoxybenzoate (20.0 g, 44.6 mmol) was dissolved in dry ether (120 mL) and then cautiously added to the flask via a syringe over a period of 20 minutes. The dark grey solution was left to stir overnight. After approximately 18 hours, H$_2$O (12 mL) was added very cautiously (drop wise) until the solution color changed from gray to bright white. The contents were then transferred to a 2 L separatory funnel. The reaction flask was alternately rinsed 3 times with distilled H$_2$O (20 mL) and ether (20 mL). One final rinse was made with 1M HCl (20 mL). All rinses were emptied into a separatory funnel. Distilled H$_2$O (200 mL) and ether (200 mL) were added to the separatory funnel. The contents of the separatory funnel were separated into an aqueous layer and an ether layer. The aqueous layer was washed 3 times with ether (200 mL). All ether fractions were combined and then washed 3 times with distilled H$_2$O (200 mL). The ether layer was washed with saturated NaCl (125 mL) and then dried with MgSO$_4$. MgSO$_4$ was removed using gravity filtration. The ether layer was then concentrated using rotary evaporation. The result was a clear viscous liquid. The liquid solidified under a high vacuum after approximately 2 hours. This produced a 18.6 g yield or a 99.2% yield of the derivative. The NMR characterization data for this derivative is as follows. $^1$NMR (300 MHz, CDCl$_3$): 0.90 (t, J=6.6, 6H, CH$_2$CH$_3$), 1.27-1.43 (m, 28H, CH$_2$(CH$_2$)$_7$), 1.71-1.86 (m, 5H, OCH$_2$CH$_2$ & OH), 3.92 (t, J=6.6, 4H, OCH$_2$), 4.60 (d, J=3.8, 2H, ArCH$_2$OH), 6.37 (t, J=1.9, 1H, ArH), 6.48 (d, J=2.2, 2H, ArH). $^{13}$C NMR (75 MHZ, CDCl$_3$): 14.23, 22.79, 26.14, 29.34, 29.44, 29.49, 29.70, 32.00, 65.51, 68.13, 100.56, 105.09, 143.28, 160.58.

EXAMPLE 12

Synthesis of 3,5-didecoxybenzyl Chloride

Dry dichloromethane (5 mL), DMF (3.04 mL, 39.2 mmol), and a magnetic stir bar were placed into a 250 mL RBF and sealed with a rubber septum. N$_2$ inlet and outlet needles were inserted into the septum. The flask was then cooled to 0° C. in an ice bath. Thionyl chloride (2.86 mL, 39.2 mmol) was added to the RBF via a syringe. The RBF was placed into an ice bath and cooled to 0° C. 3,5-didecoxybenzyl alcohol (15.0 g, 35.7 mmol) was dissolved in a solution of dichloromethane (60 mL) containing pyridine (2.88 mL, 35.7 mmol). This solution was then drawn into a syringe and added cautiously to RBF over 20 minutes. The solution gradually changed from a transparent yellow color to an opaque yellow color. Dichloromethane was used to rinse the beaker which was used to dissolve 3,5-didecoxybenzyl alcohol and then added to the RBF. The RBF was removed from the ice bath and allowed to stir overnight. The solution was then concentrated using a rotary evaporation. A solution of 50/50 ether/hexanes (100 mL) was added to the RBF, changing the solution from deep yellow to opaque white. The liquid was decanted off leaving behind any solid. The RBF was rinsed in this manner 2 more times, saving the decanted liquid. The decanted liquid was run through a silica gel baseline filtration apparatus. Filtrate was then concentrated using rotary evaporation. A compound solidified after approximately 2 hours under a high vacuum. There was a 14.8 g yield or a 94.5% yield of the derivative. The NMR characterization data for this derivative is as follows. $^1$NMR (300 MHz, CDCl$_3$): 0.88 (t, J=6.6, 6H, CH$_2$CH$_3$), 1.27-1.43 (m, 28H, CH$_2$(CH$_2$)$_7$), 1.76 (p, J=6.6, 4H, OCH$_2$CH$_2$), 3.92 (t, J=6.6, 4H, OCH$_2$), 4.50 (s, 2H, ArCH$_2$Cl), 6.39 (t, J=2.2, 1H, ArH), 6.50 (d, J=2.5, 2H, ArH). $^{13}$C NMR (75 MHZ, CDCl$_3$): 14.23, 22.78, 26.12, 29.30, 29.42, 29.47, 29.70, 32.00, 46.56, 68.18, 101.332, 106.97, 139.38, 160.52.

EXAMPLE 13

Synthesis of 3,5-didecoxybenzyl Azide 3,5-Didecoxybenzyl chloride (14.4 g, 32.8 mmol) was dissolved in DMF (50 mL) in a 250 mL RBF. Sodium azide (4.26 g, 65.6 mmol) and a magnetic stir bar were added to the RBF. The RBF was heated to just below boiling of the DMF using a heat gun. The reaction mixture was then stirred at room temperature until cool to the touch. Heating and cooling were repeated 3 times. Thin layer chromatography in hexanes showed the presence of a starting material. A heating mantel was used to gently heat the RBF. After 1 hour, thin layer chromatography showed no starting material present. The contents of the RBF were transferred to a separatory funnel. Ether (250 mL) and distilled H$_2$O (250 mL) were added to the funnel. The aqueous layer was washed 2 times with ether (250 mL). The ether layers were combined and washed 2 times with saturated ammonium chloride solution (125 mL) and once with saturated sodium chloride solution (125 mL). The ether layer was then dried with magnesium sulfate, gravity filtered and concentrated using rotary evaporation. High vacuum was then used to remove trace amounts of the ether giving. There was a 13.6 g yield or a 93.1% yield of the derivative. The NMR characterization data for this derivative is as follows. $^1$NMR (300 MHz, CDCl$_3$): 0.88 (t, J=6.6, 6H, CH$_2$CH$_3$), 1.27-1.43 (m, 28H, CH$_2$(CH$_2$)$_7$), 1.76 (p, J=6.6, 4H, OCH$_2$CH$_2$), 3.92 (t, J=6.6, 4H, OCH$_2$), 4.21 (s, 2H, ArCH$_2$N$_3$), 6.42-6.44 (m, 3H, ArH). $^{13}$C NMR (75 MHZ, CDCl$_3$): 14.23, 22.79, 26.13, 29.31, 29.45, 29.49, 29.68, 29.71, 32.01, 55.01, 65.97, 68.19, 101.08, 106.52, 137.45, 160.68.

EXAMPLE 14

Synthesis of 3,5-didecoxybenzyl Amine

Catalytic (5% by mass) palladium on carbon (0.51 g) was placed into a hydrogenation bottle. The bottle was then placed under N$_2$. To the bottle, 50/50 ether methanol (10 mL) was added. 3,5-didecoxybenzyl azide (5.0 g, 11.2 mmol) was dissolved in 50/50 ether/methanol (60 mL) and transferred to the bottle. The bottle was attached to a hydrogenator with H$_2$ pressure at 40 psi and left for 1 hour. Thin layer chromatography of the dichloromethane/10% hexanes showed the presence of an azide. The bottle was left on a hydrogenator with H$_2$ at 40 psi for an additional hour after which time, thin layer chromatography then showed no evidence of the starting material. The contents of the bottle were then vacuum filtered over celite. The filtrate was then concentrated using rotary evaporation and then placed under high vacuum for 4 or more hours. The resulting viscous liquid was dark yellow. This produced a 4.6 g yield or a 97.9% yield of the derivative. The NMR characterization data for this derivative is as follows. $^1$NMR (300 MHz, CDCl$_3$): 0.88 (t, J=6.6, 6H, CH$_2$CH$_3$), 1.27-1.46 (m, 28H, CH$_2$(CH$_2$)$_7$), 1.77 (p, J=6.6, 4H, OCH$_2$CH$_2$), 3.92 (t, J=6.6, 4H, OCH$_2$), 3.78 (s, 2H, ArCH$_2$NH$_2$), 6.33 (t, J=2.2, 1H, ArH), 6.44 (d, J=2.2, 2H, ArH). $^{13}$C NMR (75 MHZ, CDCl$_3$): 14.23, 22.79, 26.16, 29.39, 29.45, 29.50, 29.69, 29.72, 32.01, 46.80, 69.04, 99.61, 105.35, 145.79, 160.58.

EXAMPLE 15

Synthesis of C$_{10}$-C$_6$ Compound (Compound Where R is C$_{10}$ Alkyl and X is C$_6$ Alkylene)

3,5-didecoxybenzyl amine (4.41 g, 10.5 mmol) was dissolved in dichloromethane (100 mL) and placed in a 1 L RBF. A magnetic stir bar was added and the RBF was sealed with a rubber septum. 1,6-diisocyanatohexane (0.77 mL, 4.40 mmol) was added via a syringe. The RBF was gently heated with a heat gun. The solution was allowed to cool to room temperature. Dichloromethane (50 mL) was added to the RBF and the solution was again heated. Dichloromethane addition and heating were repeated 2 times. The solution was left to stir overnight. The solution was then placed in a refrigerator and allowed to cool for 30 minutes. Vacuum filtration was then used to isolate a white solid. The filtrate was concentrated to approximately half the volume using rotary evaporation. Gravity filtration was then used to isolate more white solids. The filtrate was concentrated and filtered once more producing a total of 4.0 g yield or a 83.5% yield of the compound. The NMR characterization data for the compound is as follows. $^1$H NMR (300 MHz, CDCl$_3$): 0.87 (t, J=6.6, 12H, CH$_2$CH$_3$), 1.26-1.42 (m, 64H, CH$_2$(CH$_2$)$_7$), 1.69-1.74 (m, 8H, OCH$_2$CH$_2$), 3.13 (q, J=6.3, 4H, CH$_2$CH$_2$NH), 3.85 (t, J=6.6, 8H, OCH$_2$), 4.19 (d, J=5.8, 4H, ArCH$_2$NH), 4.93 (t, J=5.5, 2H, CH$_2$NHCO), 5.16 (t, J=5.5, 2H, CONHCH$_2$), 6.29 (t, J=2.2, 2H, ArH), 6.37 (d, J=2.2, 4H, ArH). $^{13}$C NMR (75 MHZ, CDCl$_3$): 14.23, 22.78, 25.46, 26.16, 29.37, 29.43, 29.53, 29.68, 32.00, 39.58, 44.62, 68.09, 99.94, 105.75, 141.73, 158.71, 160.54. Analysis calculated for C$_{62}$H$_{110}$N$_4$O$_6$: C, 73.91; H, 11.00; N, 5.56. Found C, 73.85; H, 11.18; N, 5.59. The melting point was 80-82° C.

EXAMPLE 16

Synthesis of C$_{10}$-C$_{12}$ Compound (Compound Where R is C$_{10}$ Alkyl and X is C$_{12}$ Alkylene)

3,5-didecoxybenzyl amine (5.6 g, 13.3 mmol) was dissolved in dichloromethane (50 mL) and added to a 1 L RBF. A magnetic stir bar was added and the RBF was sealed with a rubber septum. 1,12-diisocyanatododecane (1.62 mL, 6.07 mmol) was added via a syringe. The RBF was gently heated with a heat gun. The solution was allowed to cool to room temperature. Dichloromethane (50 mL) was added to the RBF and the solution was again heated. Dichloromethane addition and heating were repeated 2 times. The reaction was left to stir overnight. The reaction solvent was removed using rotary evaporation. Acetone (500 mL) was added to the RBF and the resulting suspension was heated to help dissolution of the white solid. The RBF was then placed in a refrigerator and cooled for 30 minutes. Vacuum filtration was then used to isolate a bright white solid. This produced a 3.0 g yield or a 92.1% yield of the compound. The NMR characterization data for the compound is as follows. $^1$NMR (300 MHz, CDCl$_3$): 0.87 (t, J=6.6, 12H, CH$_2$CH$_3$), 1.26-1.43 (m, 76H, CH$_2$(CH$_2$)$_7$), 1.73 (p, J=6.6, 8H, OCH$_2$CH$_2$), 3.13 (q, J=6.8, 4H, CH$_2$CH$_2$NH), 3.87 (t, J=6.6, 8H, OCH$_2$), 4.23 (d, J=5.5, 4H, ArC$\underline{H}_2$NH), 4.60 (t, J=5.2, 2H, CH$_2$N$\underline{H}$CO), 4.88 (t, J=5.2, 2H, CON$\underline{H}$CH$_2$), 6.31 (t, J=2.2, 2H, Ar$\underline{H}$), 6.39 (d, J=1.9, 4H, Ar$\underline{H}$). $^{13}$C NMR (75 MHZ, CDCl$_3$): 14.23, 22.78, 26.16, 26.78, 29.14, 29.24, 29.28, 29.36, 29.43, 29.52, 29.68, 30.19, 32.00, 40.63, 44.80, 68.09, 100.06, 105.74, 141.55, 158.38, 160.60. Analysis calculated for C$_{68}$H$_{122}$N$_4$O$_6$: C, 74.81; H, 11.26; N, 5.13. Found C, 74.84; H, 11.44; N, 5.16. The melting point was 75-77° C.

The following are examples of the synthesis of derivatives and the synthesis of the C$_{11}$-tailed compounds (compounds where R is C$_{11}$ alkyl) from those derivatives.

EXAMPLE 17

Synthesis of 3,5-diundecoxybenzoate

To a 1 L RBF, while stirring with a magnetic stir bar, 1-bromoundecane (52.0 mL, 0.233 mol), DMF (200 mL), and potassium carbonate (43.9 g, 0.318 mol) were added. Methyl-3,5-dihydroxybenzoate (17.8 g, 0.106 mol) was dissolved in DMF (100 mL) and the solution was added to the 1 L RBF. The reaction mixture color gradually changed from an opaque pale yellow to an opaque light grey. The reaction vessel was sealed with a rubber septum and left to stir overnight. After stirring for approximately 20 hours, the contents of the RBF changed to a dark grey color and solidified. The RBF was gently heated with a heat gun until the contents liquefied. After cooling to just above room temperature, the contents of the RBF were transferred into a 2 L Erlenmeyer that contained 1 L of 30/70 ice/distilled H$_2$O mixture. A white precipitate formed on contact with H$_2$O. Vacuum filtration was used to isolate the precipitate. The white precipitate was recrystallized from absolute ethanol (500 mL) overnight. The mixture was vacuum filtered yielding fine bright white fibrous crystals. This produced a total of 46.7 g yield or a 92.6% yield of the derivative. The NMR characterization data for the derivative is as follows. $^1$NMR (300 MHz, CDCl$_3$): 0.87 (t, J=6.6, 6H, CH$_2$C$\underline{H}_3$), 1.26-1.44 (m, 32H, CH$_2$(C$\underline{H}_2$)$_8$), 1.77 (p, J=6.6, 4H, OCH$_2$C$\underline{H}_2$), 3.89 (s, 3H, OC$\underline{H}_3$), 3.95 (t, J=6.6, 4H, OC$\underline{H}$H$_2$CH$_2$), 6.63 (t, J=2.5, 1H, Ar$\underline{H}$), 7.15 (d, J=2.5, 2H, Ar$\underline{H}$). $^{13}$C NMR (75 MHZ, CDCl$_3$): 14.23, 22.79, 26.10, 29.26, 29.45, 29.68, 29.71, 32.00, 52.28, 68.37, 106.60, 107.65, 131.85, 160.21, 167.09.

EXAMPLE 18

Synthesis of 3,5-diundecoxybenzyl Alcohol

To a 250 mL flame dried RBF, LAH (1.43 g, 38.7 mmol) and a magnetic stir bar were added. The flask was sealed with a rubber septum into which N$_2$ inlet/outlet needles were added. Dry ether (10 mL) was added via a syringe to the RBF to wet the LAH. Some gas was evolved. Methyl-3,5-diundecoxybenzoate (15.0 g, 31.5 mmol) was dissolved in dry ether (120 mL) and then cautiously added to the flask via a syringe over a period of 20 minutes. The dark grey solution was left to stir overnight. After approximately 18 hours, water (12 mL) was added very cautiously (drop wise) until the solution color changed to bright white. The contents of the RBF were then transferred to a 2 L separatory funnel. The RBF was alternately rinsed 3 times with distilled H$_2$O (20 mL) and ether (20 mL). One final rinse was made with 1M HCl (20 mL). All rinses were emptied into the separatory funnel. Distilled H$_2$O (200 mL) and ether (200 mL) were added to the separatory funnel. The contents of the separatory funnel were separated into an aqueous layer and an ether layer. The aqueous layer was washed 3 times with ether (200 mL). Ether washes were added to the ether layer. The ether layer was then washed 3 times with distilled H$_2$O (200 mL), once with saturated NaCl (125 mL) and then dried with MgSO$_4$. MgSO$_4$ was removed using gravity filtration. The ether layer was then concentrated using rotary evaporation. The result was a colorless viscous liquid. The liquid solidified under high vacuum after approximately 2 hours. This produced a 13.0 g yield or a 92.1% yield of the derivative. The NMR characterization data for the derivative is as follows. $^1$NMR (300 MHz, CDCl$_3$): 0.88 (t, J=6.3, 6H, CH$_2$C$\underline{H}_3$), 1.20-1.45 (m, 32H, CH$_2$(C$\underline{H}_2$)$_8$), 1.69-1.78 (m, 5H, OCH$_2$C$\underline{H}_2$ & O$\underline{H}$), 3.92 (t, J=6.6, 4H, OC$\underline{H}_2$), 4.61 (d, J=5.5, 2H, ArC$\underline{H}_2$OH), 6.37 (t, J=2.2, 1H, Ar$\underline{H}$), 6.48 (d, J=1.9, 2H, Ar$\underline{H}$). $^{13}$C NMR (75 MHZ, CDCl$_3$): 14.23, 22.79, 26.13, 29.34, 29.44, 29.48, 29.68, 29.71, 32.00, 65.57, 68.13, 100.58, 105.10, 143.25, 160.60.

EXAMPLE 19

Synthesis of 3,5-diundecoxybenzyl Chloride

Dry dichloromethane (5 mL), DMF (3.04 mL, 39.2 mmol) and a magnetic stir bar were placed into a 250 mL RBF, and the RBF was sealed with a rubber septum. N$_2$ inlet and outlet needles were inserted into the septum. The flask was then cooled to 0° C. in an ice bath. Thionyl chloride (2.86 mL, 39.2 mmol) was added to the RBF via a syringe. The RBF was placed into an ice bath and cooled to 0° C. 3,5-diundecoxybenzyl alcohol (15.0 g, 35.7 mmol) was dissolved in a solution of dichloromethane (60 mL) and pyridine (2.88 mL, 35.7 mmol). This solution was added to the RBF via a syringe cautiously over 20 minutes. The reaction mixture gradually changed from a transparent yellow color to an opaque yellow color. The beaker used to dissolve the 3,5-diundecoxybenzyl alcohol was rinsed with dichloromethane and the rinses were added to the RBF. The RBF was removed from the ice bath and the reaction mixture was stirred overnight. The solution was then concentrated using rotary evaporation. A solution of 50/50 ether/hexanes (100 mL) was added to the RBF, changing the solution color from deep yellow to opaque white. The liquid was decanted leaving behind any solid. The RBF was rinsed in this manner 2 more times, saving the decanted liquid. The decanted liquid was run through a silica gel baseline filtration apparatus. The filtrate was then concentrated using rotary evaporation. The compound solidified after approximately 2 hours under high vacuum. This produced a 14.8 g yield or a 94.5% yield of the derivative. The NMR characterization data for the derivative is as follows. $^1$NMR (300 MHz, CDCl$_3$): 0.88 (t, J=6.9, 6H, CH$_2$C$\underline{H}_3$), 1.27-1.45 (m, 32H, CH$_2$(C$\underline{H}_2$)$_8$), 1.76 (p, J=6.6, 4H, OCH$_2$C$\underline{H}_2$), 3.92 (t, J=6.6, 4H, OC$\underline{H}_2$), 4.50 (s, 2H, ArC$\underline{H}_2$Cl), 6.39 (t, J=2.2, 1H, Ar$\underline{H}$), 6.50 (d, J=2.2, 2H, Ar$\underline{H}$). $^{13}$C NMR (75 MHz, CDCl$_3$): 14.23, 22.79, 26.13, 29.31, 29.45, 29.48, 29.68, 29.71, 32.01, 46.56, 68.19, 101.32, 106.97, 139.38, 160.53.

EXAMPLE 20

Synthesis of 3,5-diundecoxybenzyl Azide 3,5-diundecoxybenzyl chloride (13.5 g, 30.1 mmol) was dissolved in DMF (50 mL) in a 250 mL RBF. Sodium azide (3.94 g, 60.2 mmol) and a magnetic stir bar were added to the RBF. A heating mantel was used to gently heat the reaction mixture. After 1 hour, thin layer chromatography indicated that no starting material was present. The contents of the RBF were transferred to a separatory funnel. Ether (250 mL) and distilled $H_2O$ (250 mL) were added to the funnel. The aqueous layer was washed 2 times with ether (250 mL). The ether layers were combined and washed 2 times with saturated ammonium chloride solution (125 mL) and once with saturated sodium chloride solution (125 mL). The ether layer was then dried with magnesium sulfate, gravity filtered and concentrated using rotary evaporation. The resulting light yellow oil was then placed under high vacuum where it solidified. This produced a 13.3 g yield or a 97.1% yield of the derivative. The NMR characterization data for the derivative is as follows. $^1$NMR (300 MHz, $CDCl_3$): 0.88 (t, J=6.3, 6H, $CH_2C\underline{H}_3$), 1.21-1.44 (m, 32H, $CH_2(C\underline{H}_2)_7$), 1.77 (p, J=6.6, 4H, $OCH_2C\underline{H}_2$), 3.93 (t, J=6.6, 4H, $OC\underline{H}_2$), 4.24 (s, 2H, $ArC\underline{H}_2Cl$), 6.41-6.43 (m, 2H, Ar$\underline{H}$). $^{13}$C NMR (75 MHZ, $CDCl_3$): 14.22, 22.79, 26.13, 29.33, 29.44, 29.49, 29.68, 32.00, 55.00, 68.16, 101.07, 106.50, 137.45, 160.68.

EXAMPLE 21

Synthesis of 3,5-diundecoxybenzyl Amine

Catalytic (5% by mass) palladium on carbon (0.58 g) was placed into a hydrogenation bottle. The bottle was then placed under $N_2$. To the bottle, 50/50 ether methanol (10 mL) was added. 3,5-diundecoxybenzyl azide (5.0 g, 11.2 mmol) was dissolved in 50/50 ether/methanol (60 mL) and transferred to the bottle. The bottle was attached to a hydrogenator with $H_2$ pressure set at 40 psi and left for 1 hour. Thin layer chromatography (dichloromethane/10% hexanes) indicated that the azide was still present. As a result, the bottle was left on a hydrogenator with $H_2$ pressure at 40 psi for an additional 30 minutes. Thin layer chromatography then showed that the starting material was completely consumed. The contents of the bottle were then vacuum filtered over celite. The filtrate was concentrated using rotary evaporation and then placed under high vacuum for 4 or more hours. This produced a 4.4 g yield or a 93.1% yield of the derivative. The NMR characterization data for the derivative is as follows. $^1$NMR (300 MHz, $CDCl_3$): 0.86 (t, J=6.3, 6H, $CH_2C\underline{H}_3$), 1.25-1.45 (m, 32H, $CH_2(C\underline{H}_2)_8$), 1.74 (p, J=6.6, 4H, $OCH_2C\underline{H}_2$), 3.76 (s, 4H, $OC\underline{H}_2$), 3.90 (t, J=6.6, 2H, $ArC\underline{H}_2Cl$), 6.32 (t, J=2.2, 1H, Ar$\underline{H}$), 6.43 (d, J=2.2, 2H, Ar$\underline{H}$). $^{13}$C NMR (75 MHZ, $CDCl_3$): 14.20, 22.78, 26.14, 29.36, 29.42, 29.49, 29.67, 31.99, 46.35, 68.07, 99.86, 105.56, 144.47, 160.59.

EXAMPLE 22

Synthesis of $C_{11}$-$C_6$ Compound (Compound Where R is $C_{11}$ Alkyl and X is $C_6$ Alkylene)

3,5-diundecoxybenzyl amine (3.80 g, 8.49 mmol) was dissolved in dichloromethane (100 mL) in a 1 L RBF. A magnetic stir bar was added and the RBF was sealed with a rubber septum. 1,6-diisocyanatohexane (0.62 mL, 3.86 mmol) was added via a syringe. The RBF was gently heated with a heat gun. The solution was allowed to cool to room temperature. Dichloromethane (50 mL) was added to the RBF and the solution was again heated. Dichloromethane addition and heating were repeated 2 times. The solution was left to stir overnight. The solvent was then removed under reduced pressure producing a white solid. The solid was then dissolved in hot acetone (500 mL). After cooling to room temperature the acetone suspension was then placed in a refrigerator and cooled for 30 minutes. Vacuum filtration was then used to isolate a bright white solid. This produced a 4.0 g yield or a 97.5% yield of the compound. The NMR characterization data for the compound is as follows. $^1$NMR (300 MHz, $CDCl_3$): 0.87 (t, J=6.9, 12H, $CH_2C\underline{H}_3$), 1.25-1.45 (m, 78H, $CH_2(C\underline{H}_2)_8$), 1.72 (p, J=6.9, 8H, $OCH_2C\underline{H}_2$), 3.16 (q, J=6.3, 4H, $CH_2C\underline{H}_2NH$), 3.86 (t, J=6.6, 8H, $OC\underline{H}_2$), 4.23 (d, J=5.5, 4H, $ArC\underline{H}_2NH$), 4.74 (t, J=5.5, 2H, $CH_2N\underline{H}CO$), 4.94 (t, J=5.5, 2H, $CON\underline{H}CH_2$), 6.31 (t, J=1.9, 2H, Ar$\underline{H}$), 6.40 (d, J=2.2, 4H, Ar$\underline{H}$). $^{13}$C NMR (75 MHZ, $CDCl_3$): 14.23, 22.78, 26.15, 29.36, 29.45, 29.52, 29.60, 29.70, 29.72, 29.79, 31.05, 32.00, 39.49, 44.72, 68.10, 100.01, 105.76, 141.64, 158.52, 160.58, 207.22. Analysis calculated for $C_{66}H_{118}N_4O_6$: C, 74.53; H, 11.18; N, 5.27. Found C, 74.70; H, 11.34; N, 5.25. The melting point was 82-84° C.

EXAMPLE 22

Synthesis of the $C_{11}$-$C_{12}$ Compound (Compound Where R is $C_{11}$ Alkyl and X is $C_{12}$ Alkyl)

3,5-diundecoxybenzyl amine (4.1 g, 9.16 mmol) was dissolved in dichloromethane (50 mL) in a 1 L RBF. A magnetic stir bar was added and the RBF was sealed with a rubber septum. 1,12-diisocyanatododecane (1.12 mL, 4.16 mmol) was added via a syringe. The RBF was gently heated with a heat gun. The solution was allowed to cool to room temperature. Dichloromethane (50 mL) was added to the RBF and the solution was again heated. Dichloromethane addition and heating were repeated 2 more times. The reaction mixture was left to stir overnight. The dichloromethane was then removed under reduced pressure producing a white solid. The solid was then dissolved in hot acetone (500 mL). After cooling to room temperature, the acetone suspension was then placed in a refrigerator and cooled for 30 minutes. Vacuum filtration was then used to isolate a bright white solid. This produced a 3.0 g yield or a 92.1% yield of the compound. The NMR characterization data for the compound is as follows. $^1$NMR (300 MHz, $CDCl_3$): 0.87 (t, J=6.6, 12H, $CH_2C\underline{H}_3$), 1.26-1.42 (m, 92H, $CH_2(C\underline{H}_2)_8$), 1.73 (p, J=6.9, 8H, $OCH_2C\underline{H}_2$), 3.12 (q, J=6.9, 4H, $CH_2C\underline{H}_2NH$), 3.88 (t, J=6.6, 8H, $OC\underline{H}_2$), 4.23 (d, J=5.5, 4H, $ArC\underline{H}_2NH$), 4.48 (t, J=5.5, 2H, $CH_2N\underline{H}CO$), 4.76 (t, J=5.5, 2H, $CON\underline{H}CH_2$), 6.32 (t, J=1.9, 2H, Ar$\underline{H}$), 6.40 (d, J=1.9, 4H, Ar$\underline{H}$). $^{13}$C NMR (75 MHz, $CDCl_3$): 160.62, 158.29, 141,48, 105.75, 68.11, 53.53, 44.85, 40.66, 32.00, 30.15, 29.72, 29.69, 29.52, 29.44, 29.36, 29.24, 29.19, 29.10, 26.74, 26.15, 22.79, 14.23. Analysis calculated for $C_{72}H_{130}N_4O_6$: C, 75.34; H, 11.42; N, 4.88. Found C, 75.33; H, 11.61; N, 4.98. The melting point was 83-85° C.

The following are examples of the synthesis of derivatives and the synthesis of the $C_{12}$ compounds (compounds where R is $C_{12}$ alkyl) from those derivatives.

EXAMPLE 23

Synthesis of Methyl 3,5-didodecyloxybenzoate

In a 1 L RBF containing a stir bar and DMF (100 mL); methyl 3,5-dihydroxylbenzoate (20 g, 0.1190 M), potassium carbonate (49.34 g, 0.3570 M), 1-bromododecane (57.2 mL, 0.2380 M) and DMF (100 mL) were added. The reaction mixture was covered with a septum and stirred overnight. By the end of the reaction period (15 hours), the reaction mixture had turned from a pale yellow suspension to a solid dark green suspension. Heat was applied to the RBF until the reaction mixture became fluid. The dark green mixture was then added to 1 L of distilled water and ice, and copious precipitation occurred immediately. The precipitate was isolated by vacuum filtration. The precipitate was recrystallized from hot ethanol (1 L). To increase the product yield, the solution was left to stand at room temperature overnight. The crystals were vacuum filtered and the crystals air-dried yielding 58.5 g or 96.7%. The NMR characterization data for the derivative is as follows. $^1$H NMR (300 MHz, CDCl$_3$): 0.87 (t, J=6.6, 6H, CH$_2$CH$_3$), 1.15-1.6 (m, 28H, CH$_2$(CH$_2$)$_6$), 1.76 (p, J=8.0, 8H, OCH$_2$CH$_2$), 3.89 (s, 3H, OCH$_3$), 3.95 (t, J=6.6, 4H, OCH$_2$CH$_2$), 6.62 (t, J=2.5, 1H, ArH), 7.15 (d, J=2.5, 2H, ArH).

EXAMPLE 24

Synthesis of 3,5-didodecoxybenzyl Alcohol

To a flame dried 1 L RBF containing a stir bar, LAH (1.80 g, 47.5 mmol) was added. The RBF was placed in an ice bath and the reaction was capped with a septum containing a nitrogen gas line and an out-vent. Dry THF (10 mL) was added through the septum while the mixture was stirring. Methyl 3,5-dinonyloxybenzoate (20 g, 39.6 mmol) was dissolved and added in 60 mL dry THF, drop-wise through the septum. After 30 minutes, the nitrogen line and out-vent were removed and the septum was changed. The mixture was allowed to stir overnight. The RBF was placed in an ice bath. Distilled water (250 mL) was added drop-wise through the septum until the color of the reaction mixture turned white-grey. The reaction mixture was allowed to stir at room temperature for 10 minutes and then 100 mL 1M hydrochloric acid was added until the pH reached lower than 2. The mixture was then extracted with ether (5 times using 200 mL). The ether layers were combined and then washed with 200 mL distilled water, 200 mL of aqueous sodium carbonate (5%), 200 mL distilled water, and 200 mL brine, and then dried with magnesium sulfate and gravity filtered. The solvent was removed under reduced pressure yielding 13.2 g or 92.6%. The NMR characterization data for the derivative is as follows. $^1$NMR (300 MHz, CDCl$_3$): 0.87 (t, J=6.6, 6H, CH$_2$CH$_3$), 1.15-1.6 (m, 36H, CH$_2$(CH$_2$)$_9$), 1.76 (p, J=8.0, 4H, OCH$_2$CH$_2$), 3.9 (t, J=6.6, 4H, OCH$_2$CH$_2$), 4.6 (d, J=5.0, 2H, ArCH$_2$), 6.36 (t, J=2.2, 1H, ArH), 6.52 (d, J=2.2, 2H, ArH).

EXAMPLE 25

Synthesis of 3,5-didodecoxybenzyl Chloride

A 1 L RBF was prepared containing 5 mL dry dichloromethane, a stir bar, a septum, an out-vent line, and a nitrogen gas line. DMF (3.3 ml, 40.3 mmol) was added and the reaction mixture was cooled in an ice bath. Thionyl chloride (2.7 ml, 40.3 mmol) was added and the reaction mixture was allowed to stir for 10 minutes. The ice bath was then removed and the reaction was allowed to stir for an additional 10 minutes. The RBF was placed in the ice bath and a mixture of pyridine (2.72 ml, 33.6 mmol) and 3,5-didodecoxybenzyl alcohol (13.2 g, 33.6 mmol) were added and dissolved in approximately 50 mL dichloromethane, drop-wise through the septum. After 15 minutes, the RBF was removed from the ice bath and the reaction mixture was stirred for 2 hours. The reaction mixture was then placed in a refrigerator overnight. The solvent was removed by rotary evaporation. To the remaining organic matter, 100 mL of 50% ether/hexanes was added to dissolve the desired derivative. A solid orange precipitate formed, the remaining liquid was decanted off, and the precipitate was washed with an additional 100 mL 50% ether/hexanes. The combined organic liquid was vacuum filtered through silica gel into a RBF and the solvent was removed under reduced pressure. Trace solvent was removed by high vacuum overnight. There was a 10.2 g yield or a 88.5% yield. The NMR characterization data for the derivative is as follows. $^1$NMR (300 MHz, CDCl$_3$): 0.87 (t, J=6.6, 6H, CH$_2$CH$_3$), 1.15-1.6 (m, 36H, CH$_2$(CH$_2$)$_9$), 1.76 (p, J=8.0, 4H, OCH$_2$CH$_2$), 3.9 (t, J=6.6, 4H, OCH$_2$CH$_2$), 4.5 (s, 2H, ArCH$_2$), 6.36 (t, J=2.2, 1H, ArH), 6.50 (d, J=2.2, 2H, ArH).

EXAMPLE 26

Synthesis of 3,5-didodecoxybenzyl Azide

Sodium azide (3.25 g, 50.0 mmol) and DMF (25 mL) were introduced into a 1 L RBF containing 3,5-dinonoxybenzylchloride (10.0 g, 25.0 mmol) and a stir bar. The reaction mixture was then capped with a septum and an out-vent needle. The mixture was heated until warm to the touch, allowed too cool to room temperature, then heated again, (repeated 4 times). The mixture was then washed in a separatory funnel with 500 mL distilled water and ether (4 times with 100 mL). The combined ether layers were washed with ammonium chloride (2 times with 50 mL), and then the ether layer was dried with magnesium sulfate and gravity filtered into a 1 L RBF. Thin layer chromatography (10% dichlormethane/hexanes) analysis revealed that there was still a starting material in the product so the product was purified by silica gel flash chromatography (2 L 5% dichloromethane and hexanes, 2 L 7% dichloromethane and hexanes). The solvent was removed under reduced pressure and the trace solvent was removed with high vacuum. There was a 5.3 g yield or a 80% yield. The NMR characterization data for the derivative is as follows. $^1$NMR (300 MHz, CDCl$_3$): 0.87 (t, J=6.6, 6H, CH$_2$CH$_3$), 1.15-1.6 (m, 36H, CH$_2$(CH$_2$)$_9$), 1.76 (p, J=8.0, 4H, OCH$_2$CH$_2$), 3.93 (t, J=6.3, 4H, OCH$_2$CH$_2$), 4.24 (s, 2H, ArCH$_2$), 6.41 (d, J=2.2, 3H, ArH).

EXAMPLE 27

Synthesis of 3,5-didodecoxybenzyl Amine

A thick walled bottle containing a stir bar was flushed out with nitrogen gas, and 5% Palladium on activated carbon (0.53 g, 10% by mass) was added along with a solution of 50% methanol and ether (approximately 10 mL). 3,5-didodecoxybenzyl azide (5.3 g, 12.6 mmol) was added using 50% methanol and ether (approximately 40 mL). The mixture was hydrogenated with hydrogen gas at 40 psi for approximately 1½ hour. The mixture was then filtered through celite with a controlled vacuum using 50% methanol and ether. The solvent was removed from the filtrate under reduced pressure and the trace solvent was removed with the high vacuum. This produced a 5.7 g yield or a 88% yield. The NMR characterization data for the derivative is as follows. $^1$NMR (300 MHz, CDCl$_3$): 0.87 (t, J=6.6, 8H, CH$_2$CH$_3$), 1.15-1.6 (m, 36H, CH$_2$(CH$_2$)$_9$), 1.76 (p, J=8.0, 4H, OCH$_2$CH$_2$), 3.79 (s, 2H, ArCH$_2$), 3.92 (t, J=6.6, 4H, OCH$_2$CH$_2$), 6.33 (t, J=2.2, 1H, ArH), 6.40 (d, J=2.2, 2H, ArH).

EXAMPLE 28

Synthesis of C$_{12}$-C$_6$ Compound (Compound Where R is C$_{12}$ Alkyl and X is C$_6$ Alkylene)

In a 1 L RBF, 3,5-didodecoxybenzyl amine (3.4 g, 7.1 mmol) was dissolved in approximately 100 mL dichloromethane. A stir-bar was added and the RBF was sealed with a septum. 1,6-diisocyanatohexane (0.522 ml, 3.25 mmol) was added to the mixture through the septum. The reaction mixture was allowed to stir until white strands began to form and the reaction mixture solidified. Dichloromethane (approximately 50 mL) was added and the mixture was heated until all solid dissolved. The reaction mixture was allowed to stir until the reaction mixture began to thicken or solidified. Heating and dilution with dichloromethane was repeated until the reaction would not solidify (approximately 6 times). The solvent was removed from the mixture under reduced pressure, and the resulting compound was recrystallized from acetone and vacuum filtered. This produced a 4.0 g yield or 101.7% yield (The high percentage yields (over 100%) of the compounds are attributed to acetone adhering to the compounds and the high vacuum system not functioning properly to dry the samples.). The NMR characterization data for the compound is as follows. $^1$NMR (300 MHz, CDCl$_3$): 0.88 (t, J=6.3, 6H, CH$_2$C$\underline{H}_3$), 1.1-1.55 (m, 80H, CH$_2$(C$\underline{H}_2$)$_9$ and (C$\underline{H}_2$)$_4$), 1.76 (p, J=6.6, 8H, OCH$_2$C$\underline{H}_2$), 3.17 (q, J=6.1, 4H, NC$\underline{H}_2$CH$_2$), 3.86 (t, J=6.6, 8H, OC$\underline{H}_2$CH$_2$), 4.22 (d, J=5.5, 4H, ArC$\underline{H}_2$NH), 4.74 (t, J=5.5, 2H, CH$_2$N$\underline{H}$C), 4.96 (t, J=5.5, 2H, CN$\underline{H}$CH$_2$), 6.30 (s, 2H, Ar$\underline{H}$), 6.39 (d, J=2.2, 4H, ArH). $^{13}$C NMR (75 MHZ, CDCl$_3$): 160.53, 158.74, 141.77, 105.77, 99.96, 68.08, 44.60, 39.62, 32.01, 29.73, 29.54, 29.45, 29.39, 26.16, 25.56, 22.78, 14.21. Analysis calculated for C$_{70}$H$_{126}$N$_4$O$_6$: C, 75.08; H, 11.34; N, 5.00. Found C, 74.96; H, 11.40; N, 4.88. The melting point was 99-100° C.

EXAMPLE 29

Synthesis of C$_{12}$-C$_{12}$ Compound (Compound Where R is C$_{12}$ Alkyl and X is C$_{12}$ Alkylene)

In a 1 L RBF, 3,5-didodecoxybenzyl amine (2.1 g, 5.3 mmol) was dissolved in approximately 100 mL dichloromethane. A stir-bar was added and the RFB sealed with a septum. 1,12-diisocyanatododecane (0.332 ml, 2.64 mmol) was added to the reaction mixture through the septum. The reaction mixture was allowed to stir until white strands began forming and the reaction mixture solidified. Approximately 50 mL of dichloromethane was added and the mixture was heated until the solid dissolved. The reaction mixture was then allowed to stir at room temperature until the mixture began to solidify. Heating and dilution were repeated until the reaction would not solidify. The solvent was removed from the mixture under reduced pressure, and the resulting compound was recrystallized from acetone and vacuum filtered. This produced a 3.01 g yield or a 100.1% yield of the compound (The high percentage yields (over 100%) of the compounds are attributed to acetone adhering to the compounds and the high vacuum system not functioning properly to dry the samples.). The NMR characterization data for the compound is as follows. $^1$NMR (300 MHz, CDCl$_3$): 0.88 (t, J=6.3, 12H, CH$_2$C$\underline{H}_3$), 1.1-1.55 (m, 92H, CH$_2$(C$\underline{H}_2$)$_9$ and (C$\underline{H}_2$)$_{10}$), 1.76 (p, J=6.6, 4H, OCH$_2$C$\underline{H}_2$), 3.17 (q, J=6.1, 4H, NC$\underline{H}_2$CH$_2$), 3.86 (t, J=6.6, 8H, OC$\underline{H}_2$CH$_2$), 4.22 (d, J=5.5, 4H, ArC$\underline{H}_2$NH), 4.74 (t, J=5.5, 2H, CH$_2$N$\underline{H}$C), 4.96 (t, J=5.5, 2H, CN$\underline{H}$CH$_2$), 6.30 (s, 2H, Ar$\underline{H}$), 6.39 (d, J=2.2, 4H, ArH). $^{13}$C NMR (75 MHz, CDCl$_3$): 14.23, 22.79, 26.15, 29.16, 29.36, 29.45, 29.70, 32.01, 68.11, 76.23, 76.68, 77.10, 77.30, 77.52, 105.77, 160.64. Analysis calculated for C$_{76}$H$_{138}$N$_4$O$_6$: C, 75.82; H, 11.55; N, 4.65. Found C, 75.80; H, 11.67; N, 4.66. The melting point was 88-90° C.

Other compounds with C9 to C12 tails and linkers of C6 to C12 length (the compounds according to the present invention where R is C$_9$ alkyl to C$_{12}$ alkyl and X is C$_6$ alkylene to C$_{12}$ alkylene) were made in a similar process described in the Examples above. Their critical concentration in different solvents were determined. These compounds were found to have excellent gelation properties as shown in Tables 1 and 2.

EXAMPLE 30

Critical Concentrations of Compounds in Solvents

The critical concentrations for the gelation of solvents were determined and shown in Tables 1 and 2. The critical concentration (CC) is defined to be the minimum concentration of the gelator/compound in the solvent at which fluidic motion stops.

The phrase "fluidic motion" is defined as when a material acts in a dynamic way and flows as in a liquid state. This "fluidic motion" can be characterized by a process of determining the critical concentration of a compound in the composition of the present invention, as demonstrated in the method described below (this characterization can be demonstrated by other equivalent methods). At the critical concentration, a solvent which is enclosed by a compound in a composition, behaves like a solid because the composition does not move when the test tube, or other vessels, which contains the composition, is inverted. When this happens, this phenomenon is characterized as when "fluidic motion stops".

The method for determining the critical concentration and when "fluidic motion stops" for a solvent in the composition of the present invention, is as follows. First, an amount of the gelator or compound is weighed and placed into a vial or test tube that has a ball bearing in it. Next, a known volume of solvent is added. The vial is then sealed and heated to dissolve the gelator/compound. To insure homogeneity, the sample is agitated by moving the ball bearing with a magnet. The sample is then allowed to anneal at room temperature (approximately 22° C.) for 1 hour. At which time the vial is inverted. If the sample does not move, another aliquot of solvent is added and the sample heated, agitated and annealed as before. This process is repeated until the gel does not form and the previous concentration is taken to be the critical concentration. The actual critical concentrations may be at or slightly below the reported critical concentrations in Tables 1 and 2 due to this technique. It was found that at higher concentrations, the gels tended to form very quickly. It was also found that if the solvents are chemically structured longer than pentane, the high concentration gels set in the matter of minutes.

TABLE 1

Critical Concentration Using C$_6$ Linked Organogelators (X is C$_6$ alkylene)$^a$

| Solvent | C$_9$-C$_6$ | | C$_{10}$-C$_6$ | | C$_{11}$-C$_6$ | | C$_{12}$-C$_6$ | |
|---|---|---|---|---|---|---|---|---|
| | mM | wt % | mM | wt % | mM | wt % | mM | wt % |
| Pentane | 5.9 | 0.87 | 32 | 4.9 | 0.73 | 0.12 | 38 | 6.4 |
| Hexane | 3.2 | 0.45 | 2.1 | 0.31 | 5.0 | 0.80 | 2.3 | 0.31 |
| Heptane | 2.8 | 0.39 | 11 | 1.3 | 3.0 | 0.46 | 0.91 | 0.13 |
| Octane | 1.4 | 0.19 | 7.4 | 0.91 | 0.47 | 0.071 | 0.50 | 0.060 |
| Nonane | 0.77 | 0.10 | 0.71 | 0.086 | 0.75 | 0.11 | | |

TABLE 1-continued

Critical Concentration Using $C_6$ Linked Organogelators (X is $C_6$ alkylene)[a]

| Solvent | $C_9$-$C_6$ | | $C_{10}$-$C_6$ | | $C_{11}$-$C_6$ | | $C_{12}$-$C_6$ | |
|---|---|---|---|---|---|---|---|---|
| | mM | wt % | mM | wt % | mM | wt % | mM | wt % |
| Decane | 0.55 | 0.071 | 0.53 | 0.070 | 0.70 | 0.10 | 0.43 | .059 |
| Undecane | 0.39 | 0.050 | 0.50 | 0.070 | 0.56 | 0.081 | 0.37 | .055 |
| Dodecane | 1.3 | 0.12 | 0.41 | 0.060 | 0.38 | 0.054 | 0.34 | .045 |
| Acetone | 4.8 | 0.57 | 3.6 | 0.46 | 3.5 | 0.47 | | |
| Benzene | 55 | 5.2 | 3.0 | 0.34 | 4.2 | 0.47 | | |
| Canola oil | 0.32 | 0.033 | .88 | 0.10 | 0.47 | 0.55 | | |
| Chloroform | ppt | ppt | Ppt | ppt | Ppt | Ppt | | |
| Cyclohexane | 20 | 2.4 | 1.6 | 0.18 | 1.7 | .23 | | |
| Dichloromethane | 61 | 4.2 | 31 | 2.2 | Ppt | Ppt | | |
| DMF | ppt | ppt | 11 | 1.1 | 7.9 | 0.89 | | |
| Absolute Ethanol | 6.2 | 0.71 | 3.2 | 0.41 | 3.2 | 0.41 | | |
| Ethylene glycol | ppt | ppt | ppt | ppt | Ppt | Ppt | | |
| Iso-octane | 2.9 | 0.39 | 0.86 | 0.090 | 0.94 | 0.14 | | |
| Hexadecane | 2.6 | 0.32 | 0.37 | 0.050 | 0.36 | 0.049 | 0.25 | 0.036 |
| Methanol | 2.8 | 0.30 | 1.0 | 0.13 | 2.3 | 0.27 | | |
| Toluene | ppt | 0.55 | 3.1 | 0.36 | 4.1 | 0.50 | | |
| n-Propanol | 46 | 5.2 | 2.2 | 0.27 | 6.6 | 0.87 | | |
| 2-Propanol | 24 | 2.8 | ppt | ppt | 4.4 | 0.60 | | |
| Veg oil | 0.61 | 0.060 | | | | | | |
| Gasoline | 5.5 | 0.70 | | | | | 3.7 | 0.49 |
| Cycolhexanol | ppt | ppt | | | | | | |
| Octyl alcohol | 53 | 5.8 | | | | | | |
| n-Amyl alcohol | 77 | 8.2 | | | | | | |
| Benzyl alcohol | ppt | ppt | | | | | | |
| Tert-Amyl alcohol | 38 | 4.3 | | | | | | |
| Sec-Butyl alcohol | 18 | 2.1 | | | | | | |
| Hexyl Alcohol | 40 | 4.4 | | | | | | |
| n-Butyl Alcohol | ppt | ppt | | | | | | |
| Ethyl acetate | | | 3.3 | 0.36 | 3.8 | 0.44 | | |
| DMSO | | | 4.5 | 0.32 | 4.1 | 0.40 | | |

[a]ppt gelator precipitated out of solution.

TABLE 2

Critical Concentration Using $C_{12}$ linked Organogelators (X is $C_{12}$ alkylene)[a]

| Solvent | $C_9$-$C_{12}$ | | $C_{10}$-$C_{12}$ | | $C_{11}$-$C_{12}$ | | $C_{12}$-$C_{12}$ | |
|---|---|---|---|---|---|---|---|---|
| | mM | wt % | mM | wt % | mM | wt % | mM | wt % |
| Pentane | 4.6 | 0.76 | 20 | 3.4 | 0.51 | 0.086 | 16 | 2.9 |
| Hexane | 1.5 | 0.24 | 1.2 | 0.20 | 0.72 | 0.12 | 1.2 | 0.21 |
| Heptane | 6.0 | 0.90 | 0.72 | 0.10 | 0.35 | 0.055 | 0.65 | 0.096 |
| Octane | 6.6 | 0.96 | 0.65 | 0.090 | 0.61 | 0.092 | 0.48 | 0.071 |
| Nonane | 4.7 | 0.67 | | | 0.58 | 0.086 | | |
| Decane | 2.4 | 0.34 | 0.50 | 0.080 | 0.61 | 0.089 | 0.38 | 0.063 |
| Undecane | 2.4 | 0.34 | 0.46 | 0.070 | 0.51 | 0.073 | 0.33 | 0.054 |
| Dodecane | 0.57 | 0.079 | 0.38 | 0.060 | 0.48 | 0.068 | 0.31 | 0.050 |
| Acetone | 3.0 | 0.39 | 1.9 | 0.26 | ppt | Ppt | | |
| Benzene | 63 | 6.4 | 1.5 | 0.19 | 3.21 | 0.358 | | |
| Canola oil | 0.33 | 0.038 | 0.60 | 0.080 | 0.56 | 0.066 | | |
| Chloroform | 20 | 12 | | | | | | |
| Cyclohexane | 1.8 | 0.24 | | | 0.83 | 0.11 | | |
| Dichloromethane | 8.2 | 0.64 | 16 | 1.3 | 4.7 | 0.37 | | |
| DMF | 9.5 | 1.0 | ppt | ppt | ppt | Ppt | | |
| Absolute Ethanol | ppt | ppt | ppt | ppt | ppt | Ppt | | |
| Ethylene glycol | ppt | ppt | | | ppt | Ppt | | |
| Iso-octane | 2.7 | 0.41 | 0.64 | 0.080 | 0.71 | 0.11 | | |
| Hexadecane | 1.3 | 0.17 | 0.34 | 0.050 | 0.49 | .067 | 0.21 | 0.032 |
| Methanol | ppt | ppt | ppt | ppt | ppt | Ppt | | |
| Toluene | 11 | 1.3 | 2.1 | 0.27 | 3.98 | 0.487 | | |
| n-Propanol | 39 | 4.7 | ppt | ppt | ppt | Ppt | | |
| 2-Propanol | 23 | 3.0 | ppt | ppt | ppt | Ppt | | |
| Veg oil | 0.46 | 0.050 | | | | | | |
| Gasoline | 4.3 | 0.60 | | | | | | |
| Cycolhexanol | 52 | 5.4 | | | | | | |
| Octyl alcohol | 17 | 2.1 | | | | | | |
| n-Amyl alcohol | 27 | 3.4 | | | | | | |
| Benzyl alcohol | 97 | 8.7 | | | | | | |
| Tert-Amyl | | | | | | | | |

TABLE 2-continued

Critical Concentration Using $C_{12}$ linked Organogelators (X is $C_{12}$ alkylene)[a]

| Solvent | $C_9$-$C_{12}$ | | $C_{10}$-$C_{12}$ | | $C_{11}$-$C_{12}$ | | $C_{12}$-$C_{12}$ | |
|---|---|---|---|---|---|---|---|---|
| | mM | wt % | mM | wt % | mM | wt % | mM | wt % |
| alcohol | 47 | 5.7 | | | | | | |
| Sec-Butyl alcohol | 20 | 2.5 | | | | | | |
| Hexyl Alcohol | 45 | 5.5 | | | | | | |
| n-Butyl Alcohol | 3.2 | 0.36 | | | | | | |
| Ethyl acetate | | | 1.4 | 0.17 | 1.7 | 0.19 | | |
| DMSO | | | 3.6 | 0.28 | 3.3 | 0.32 | | |
| Mineral Oil | | | 0.45 | 0.060 | 0.44 | 0.053 | | |

[a]ppt gelator precipitated out of solution.

It was determined that the gels or compositions of the present invention are thermoreversible. In other words, the gelation process of the compositions of the present invention, or the forming of the gel, is reversible by the application of heat. This process can be demonstrated by other related applications of heat, such as sonification, where the gel structure is disrupted. Specifically, with respect to the gels or compositions of the present invention, heat is applied to melt the gels or disrupt the macromolecular structure of the gel, and as the solvent cools, the gel will reform. This phenomenon occurs repeated and indefinitely until the solvent is evaporated due to the heat.

Sonication studies were performed to determine the viability of recovery of the compounds. The sonication studies of gasoline gels of the $C_{12}$-$C_6$ compound at the CC showed that the gels can be broken down to viscous liquids. Viscous liquids were formed from 3.00-mL samples of these gels after being sonicated for approximately 20-30 seconds. At this time the solutions were warm to the touch but not warm enough to boil. The samples were allowed to cool to room temperature for 1 hour. The samples were no longer gels but viscous liquids with what appeared to be small particulates of the suspended gelling agent. The samples remained viscous liquids for at least two weeks. Two attempts at recovering the gelling agent/compound were done, one with a silica gel and another without the silica gel. The filtration recovery of the sample with the silica gel produced very little free solvent. Given the sample size and the size of the glass frit used (30 mL, 0.5 inch silica gel) the majority of the solvent was adsorbed by the silica gel. When just using the frit, approximately 2 mL of solvent was recovered with no evidence of the gelator/compound via thin layer chromatography. Some of the solvent did not leave the gelator/compound. However, the remainder of the lost solvent was most probably due to the strong vacuum applied to the system. A better trapping system would lead to a more quantitative recovery of the solvent. Another option would be for a pressure filtration and not a vacuum filtration. Either way, with proper filers and trapping systems, solvent recovery from the broken gels can be maximized.

The low critical concentration of the compounds in the solvents shown in Tables 1 and 2 are advantageous to forming a gel because less materials are used to form a stable, thermoreversible gel.

Thus, the desired solvent in the composition of the present invention, as shown in Table 1 above, can be pentane, hexane, heptane, octane, nonane, decane, undecane, dodecane, hexadecane, acetone, benzene, canola oil, chloroform, cyclohexane, dichloromethane, N,N-dimethylformamide, absolute ethanol, ethylene glycol, ethy acetate, iso-octane, hexadecane, methanol, toluene, n-propanol, 1-propanol, 2-propanol, mineral oil, vegetable oil, gasoline, cylcohexanol, octyl alcohol, n-amyl alcohol, benzyl alcohol, tert-amyl, sec-butyl, alcohol, hexyl alcohol, n-butyl alcohol, tetrahydrofuran, dimethyl sulfoxide or glycerine.

Additionally, the desired solvent in the composition of the present invention, as shown in Table 2 above, can be pentane, h-hexane, heptane, octane, nonane, decane, undecane, dodecane, hexadecane, canola oil, acetone, methanol, ethanol, 1-propanol, 2-propanol, mineral oil, tetrahydrofuran, dichlormethane, chloroform, toluene, dimethyl sulfoxide, N,N-dimethylformamide, ethylene glycol, ethyl acetate, iso-octane, glycerine, cyclohexane or benzene.

Based on the low critical concentration needed and stability of the formed gel, the most desireable solvent in the composition of the present invention is either ethanol, dichloromethane, dimethyl sulfoxide or tetrahydrofuran.

The compounds of the present invention and the method of forming the composition or the gel of the present invention can be used for the safe transportation of volatile organic solvents like gasoline, cooking oil, and contaminated organic liquids heading for incineration. As shown above, the compounds are thermoreversible organogelators that will solidify organic liquids. In this state, tanker trucks carrying thousands of gallons of organic liquid (gasoline) will not experience sloshing or movement of their load while on the highways, thus reducing the chance of jackknifing and spilling of the load. Additionally, in a gelled state, should a truck be involved in an accident, the gelled material is less likely to escape from the truck. If ignited, the solvent will not have as much surface area exposure to the air, thus limiting the intensity of a fire. Once at the desired destination, the gel can be broken down to a viscous liquid by sonication and the gelator removed from the bulk liquid by pressure filtration, vacuum filtration or distillation. The recovered gelator/compound can then be recycled and used to gel yet another load of material. Should the compounds be used for the transportation of liquids headed for incineration, it is not necessary and probably not desirable to remove the gelator/compound. Again, sonication will break apart the gel, transforming the bulk material to a viscous liquid that can be pumped into the incinerator. Since the compounds of the present invention are composed of carbon, hydrogen, nitrogen and oxygen and they are less than 5% nitrogen by mass, the compounds should not interfere in the operation of an incinerator.

By no means is the above statement meant to indicate that only tanker trucks could be used in the manner of transporting a solvent. It is expected that any size container can be used so long as it is designed to be compatible with the solvent that needs to be gelled. Thus, the compounds of the present invention can be used simply for a desired containment of a solvent.

Changes can be made in the composition and the operation and arrangement of the method of the present invention described herein without departing from the concept and scope of the invention as defined in the following claims:

What is claimed is:

1. A compound of the formula:

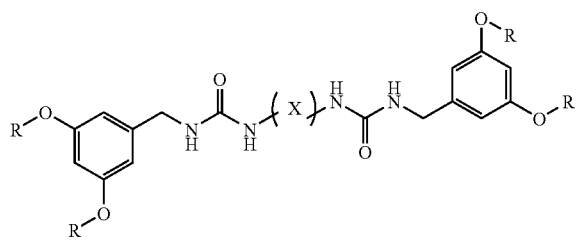

where X is $C_6$ to $C_{12}$ alkylene and R is $C_9$ to $C_{12}$ alkyl.

2. The compound of claim 1, wherein X is $C_6$ alkylene and R is $C_{10}$ alkyl.

3. The compound of claim 1, wherein X is $C_6$ alkylene and R is $C_{11}$ alkyl.

4. The compound of claim 1, wherein X is $C_6$ alkylene and R is $C_{12}$ alkyl.

5. The compound of claim 1, wherein X is $C_{12}$ alkylene and R is $C_{10}$ alkyl.

6. The compound of claim 1, wherein X is $C_{12}$ alkylene and R is $C_{11}$ alkyl.

7. The compound of claim 1, wherein X is $C_{12}$ alkylene and R is $C_{12}$ alkyl.

8. A compound of the formula:

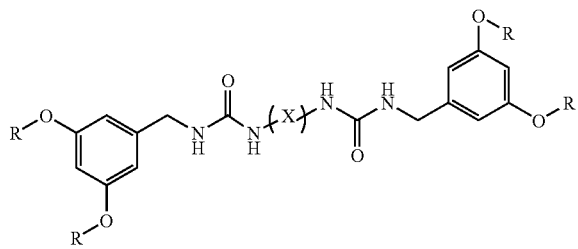

wherein X is $C_6$ to $C_{12}$ alkylene, each R is $C_9$ to $C_{12}$ alkyl, provided that when X is $C_6$ alkylene each R must be $C_{10}$ alkyl.

9. The compound of claim 8, wherein each R is $C_{10}$ alkyl.

10. The compound of claim 9, wherein X is $C_{12}$ alkylene.

11. The compound of claim 8, wherein each R is $C_{12}$ alkyl.

12. The compound of claim 11, wherein X is $C_{12}$ alkylene.

13. A composition comprising:
a compound of the formula:

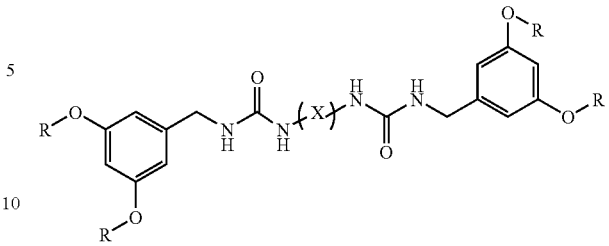

wherein X is $C_6$ to $C_{12}$ alkylene and each R is $C_9$ to $C_{12}$ alkyl; and
a solvent,
wherein said composition is at a critical concentration and said critical concentration is the minimum amount of said compound in said solvent at which fluidic motion of said solvent stops.

14. The composition of claim 13, wherein each R is $C_{10}$ alkyl.

15. The composition of claim 14, wherein X is $C_6$ alkylene.

16. The composition of claim 14, wherein X is $C_{12}$ alkylene.

17. The composition of claim 13, wherein each R is $C_{12}$ alkyl.

18. The composition of claim 17, wherein X is $C_{12}$ alkylene.

19. The composition of claim 13, wherein said solvent is selected from the group consisting of pentane, hexane, heptane, octane, nonane, decane, undecane, dodecane, hexadecane, acetone, benzene, canola oil, chloroform, cyclohexane, dichloromethane, N,N-dimethylformamide, absolute ethanol, ethylene glycol, ethy acetate, iso-octane, hexadecane, methanol, toluene, n-propanol, 1-propanol, 2-propanol, mineral oil, vegetable oil, gasoline, cyclohexanol, octyl alcohol, n-amyl alcohol, benzyl alcohol, tert-amyl, sec-butyl, alcohol, hexyl alcohol, n-butyl alcohol, tetrahydrofuran, dimethyl sulfoxide and glycerine.

20. The composition of claim 13, wherein said solvent is selected from the group consisting of pentane, n-hexane, heptane, octane, nonane, decane, undecane, dodecane, hexadecane, canola oil, acetone, methanol, ethanol, 1-propanol, 2-propanol, mineral oil, tetrahydrofuran, dichlormethane, chloroform, toluene, dimethyl sulfoxide, N,N-dimethylformamide, ethylene glycol, ethyl acetate, iso-octane, glycerine, cyclohexane and benzene.

21. The composition of claim 13, wherein said solvent is selected from the group consisting of ethanol, dichloromethane, dimethyl sulfoxide and tetrahydrofuran.

22. The composition of claim 13, wherein each R is $C_{10}$ alkyl, X is $C_6$ alkylene and said solvent is selected from the group consisting of pentane with a critical concentration of about 4.9 weight percent, n-hexane with a critical concentration of about 0.31 weight percent, heptane with a critical concentration of about 1.3 weight percent, octane with a critical concentration of about 0.91 weight percent, nonane with a critical concentration of about 0.42 weight percent, decane with a critical concentration of about 0.07 weight percent, undecane with a critical concentration of about 0.07 weight percent, dodecane with a critical concentration of about 0.06 weight percent and hexadecane with a critical concentration of about 0.05 weight percent.

23. The composition of claim 13, wherein each R is $C_{10}$ alkyl, X is $C_{12}$ alkylene and said solvent is selected from the group consisting of pentane with a critical concentration of about 3.4 weight percent, n-hexane with a critical concentration of about 0.20 weight percent, heptane with a critical concentration of about 0.72 weight percent, octane with a critical concentration of about 0.09 weight percent, decane with a critical concentration of about 0.08 weight percent, undecane with a critical concentration of about 0.07 weight percent, dodecane with a critical concentration of about 0.06 weight percent and hexadecane with a critical concentration of about 0.05 weight percent.

24. The composition of claim 13, wherein X is $C_6$ alkylene and R is $C_{11}$ alkyl.

25. The composition of claim 13, wherein X is $C_6$ alkylene and R is $C_{12}$ alkyl.

26. The composition of claim 13, wherein X is $C_{12}$ alkylene and R is $C_{11}$ alkyl.

27. The composition of claim 13, wherein the solvent is hazardous.

28. A method of converting a composition of claim 13 to a liquid form, comprising a step of sonication.

29. The method of claim 28 further comprising a step of vacuum filtration.

30. A method of forming a gel to immobilize a solvent comprising:

providing a critical concentration of a composition by adding a compound to a hazardous solvent, wherein said compound has the formula:

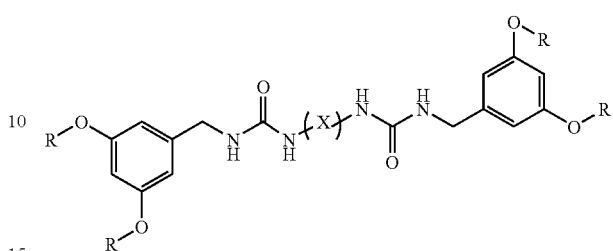

wherein X is $C_6$ to $C_{12}$ alkylene and each R is $C_9$ to $C_{12}$ alkyl and wherein said critical concentration is the minimum amount of said compound in said solvent at which fluidic motion of said solvent stops.

* * * * *